United States Patent
Conley et al.

(10) Patent No.: US 9,765,273 B2
(45) Date of Patent: Sep. 19, 2017

(54) MONODISPERSE LUBRICANT INCLUDING MULTIDENTATE PERFLUOROPOLYETHER STRUCTURES

(71) Applicant: Western Digital Technologies, Inc., Irvine, CA (US)

(72) Inventors: Nicholas R. Conley, Redwood City, CA (US); Xueqian Kong, San Jose, CA (US); Bruno Marchon, Palo Alto, CA (US)

(73) Assignee: Western Digital Technologies, Inc., Irvine, CA (US)

(*) Notice: Subject to any disclaimer, the term of this patent is extended or adjusted under 35 U.S.C. 154(b) by 35 days.

(21) Appl. No.: 14/480,552

(22) Filed: Sep. 8, 2014

(65) Prior Publication Data
US 2016/0068778 A1    Mar. 10, 2016

(51) Int. Cl.
*C10M 107/38* (2006.01)
*G11B 5/725* (2006.01)
*G11B 5/84* (2006.01)

(52) U.S. Cl.
CPC .......... *C10M 107/38* (2013.01); *G11B 5/725* (2013.01); *G11B 5/8408* (2013.01)

(58) Field of Classification Search
CPC combination set(s) only.
See application file for complete search history.

(56) References Cited

U.S. PATENT DOCUMENTS

| | | | |
|---|---|---|---|
| 5,536,577 A | 7/1996 | Murayama et al. | |
| 7,683,012 B2 | 3/2010 | Burns et al. | |
| 8,409,660 B2 | 4/2013 | Brown et al. | |
| 2010/0035083 A1 | 2/2010 | Yang et al. | |
| 2010/0266754 A1* | 10/2010 | Brown ................ | G11B 5/8408 427/127 |

(Continued)

OTHER PUBLICATIONS

Examination Report from United Kingdom Application No. GB1515519.5, dated Feb. 24, 2016.

(Continued)

*Primary Examiner* — Taiwo Oladapo
(74) *Attorney, Agent, or Firm* — Foley & Lardner LLP

(57) ABSTRACT

In one embodiment, a method for forming a substantially monodisperse lubricant includes: providing a plurality of perfluoropolyether (PFPE) precursors, each PFPE precursor including two end segments and a PFPE backbone disposed therebetween; protecting one of the end segments of each PFPE precursor with one or more protecting agents to form a plurality of mono-protected PFPE precursors, each mono-protected PFPE precursor including a protected end segment and an unprotected end segment; and coupling the unprotected end segment of each of the mono-protected PFPE precursors to the unprotected end segment of another of the mono-protected PFPE precursors via a coupling agent to form multidentate PFPE structures. In another embodiment, a substantially monodisperse lubricant includes a plurality of multidentate perfluoropolyether (PFPE) structures, each multidentate PFPE structure including at least two end segments and a middle segment therebetween, wherein the multidentate PFPE structures have a molecular weight that is substantially the same.

25 Claims, 23 Drawing Sheets

(56) References Cited

U.S. PATENT DOCUMENTS

2012/0276417 A1 11/2012 Shimokawa et al.
2012/0282491 A1 11/2012 Burns et al.
2013/0157082 A1 6/2013 Deng et al.

OTHER PUBLICATIONS

Examination Report from United Kingdom Application No. GB1515519.5, dated Oct. 24, 2016.
"Stiff-chain Multidentate Lubricant for Low-Flying HDD Applications," ip.com/IPCOM/000228517, retrieved Dec. 30, 2013, 1 page.
Guo et al. "Multidentate functionalized lubricant for ultralow head/disk spacing in a disk drive," Journal of Applied Physics, vol. 100, 2006, pp. 044306-1-044306-8.
Guo et al., "A multidentate lubricant for use in hard disk drives at sub-nanometer thickness," Journal of Applied Physics, vol. 111, 2012, pp. 024503-1-024503-7.
Kim et al., "Humidity effects on lubricant transfer in the head-disk interface of a hard disk drive," Journal of Applied Physics, vol. 105, 2009, pp. 07B704-1-07B704-3.
Kondo et al., "Ionic Liquid Lubricant with Ammonium Salts for Magnetic Media," Applications of Ionic Liquids in Science and Technology, Prof. Scott Handy (Ed.), ISBN: 978-953-307-605-8, 2011, pp. 421-446.
Marchon et al. "Fomblin Multidentate Lubricants for Ultra-Low Magnetic Spacing," IEEE Transactions on Magnetics, vol. 42, No. 10, Oct. 2006, pp. 2504-2506.

\* cited by examiner

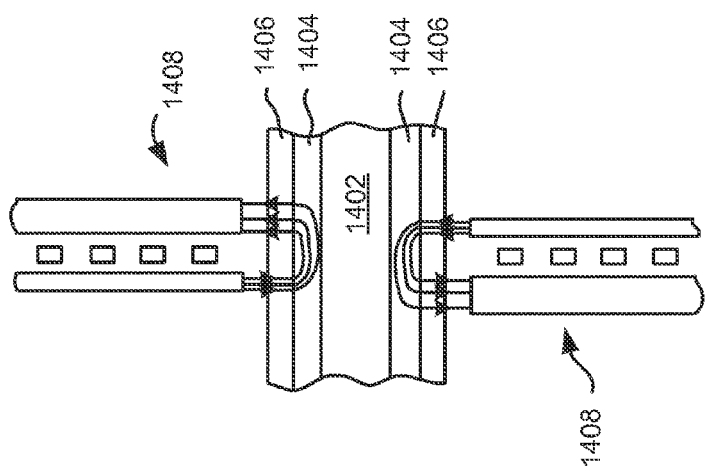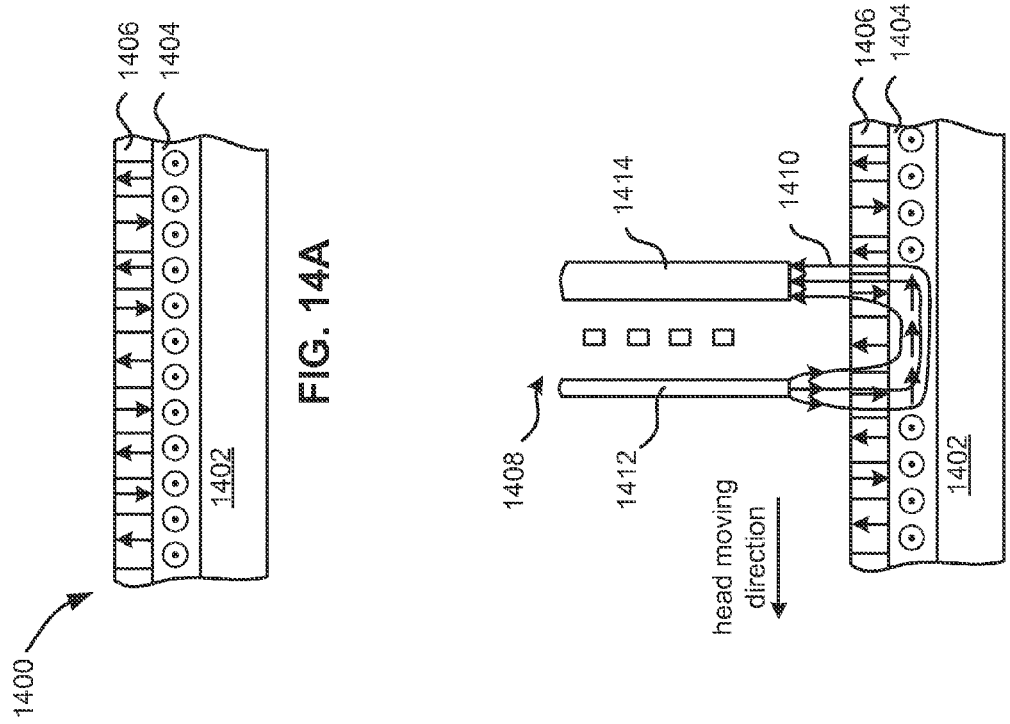

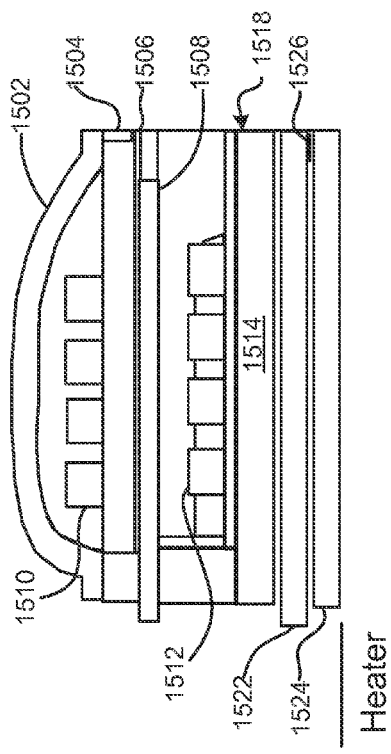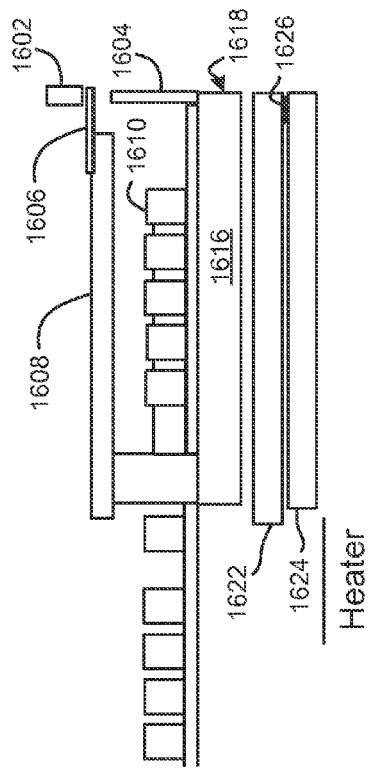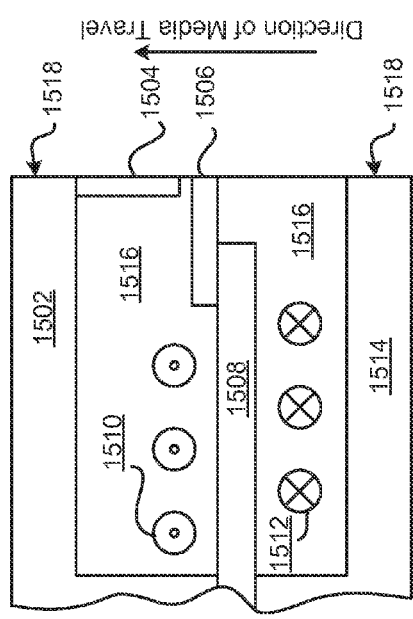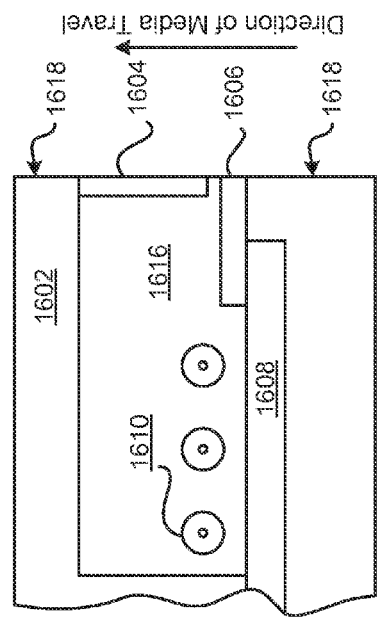
FIG. 15B
FIG. 16B
FIG. 15A
FIG. 16A

MONODISPERSE LUBRICANT INCLUDING MULTIDENTATE PERFLUOROPOLYETHER STRUCTURES

FIELD OF THE INVENTION

The present invention relates to lubricants, and more particularly, this invention relates to monodisperse lubricants that include multidentate perfluoropolyether structures, and which may be especially suited for use as a lubricant layer for magnetic recording media.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in their limited area and volume. A technical approach to meet this desire is to increase the capacity by increasing the recording density of the HDD. To achieve higher recording density, further miniaturization of recording bits is effective, which in turn typically requires the design of smaller and smaller components. This reduction in component size is aided by the ability to maintain the reading and writing elements in a magnetic head in a position closer to the magnetic recording layer of the magnetic medium. This distance between the reading and writing elements and the magnetic recording layer is referred to as the magnetic spacing.

Narrowing the magnetic spacing is a very effective method for improving the recording density of a magnetic recording device, such as a HDD. Reducing the clearance, which is defined as the gap between the lowest point (farthest protruding portion at the ABS) of the magnetic head and the uppermost surface of the magnetic medium has been attempted to reduce the magnetic spacing. A technique used in magnetic recording devices to reduce this clearance relies on thermal expansion of one or more portions of the magnetic head. This thermal expansion is caused by a heater which is positioned near one or more elements of the magnetic head such that applying current to this heater controls the expansion of the one or more portions of the magnetic head to provide a smaller head-to-medium clearance.

However, a smaller clearance may also lead to undesirable interactions between the slider and a lubricant layer of the magnetic medium. Such slider-lubricant interactions may create moguls, ripples, depletions, etc. in the lubricant. Slider-lubricant interactions may also cause the lubricant to accumulate on the leading edge of the slider, thereby negatively affecting the performance of the read and write heads. Moreover, the lubricant accumulated on the leading edge of the slider may fall back onto the magnetic medium's surface, resulting in a lubricant layer having non-uniform thickness. Unfortunately, a non-uniform lubricant layer (e.g. a lubricant layer including moguls, ripples, thicker regions, etc.) may lead to errors during read and/or write operation, as well as allow scratching of the magnetic medium's surface in regions with little to no lubricant.

SUMMARY

According to one embodiment, a method for forming a substantially monodisperse lubricant includes: providing a plurality of perfluoropolyether (PFPE) precursors, each PFPE precursor including two end segments and a PFPE backbone disposed therebetween; protecting one of the end segments of each PFPE precursor with one or more protecting agents to form a plurality of mono-protected PFPE precursors, each mono-protected PFPE precursor including a protected end segment and an unprotected end segment; and coupling the unprotected end segment of each of the mono-protected PFPE precursors to the unprotected end segment of another of the mono-protected PFPE precursors via a coupling agent to form multidentate PFPE structures.

According to another embodiment, a substantially monodisperse lubricant includes a plurality of multidentate perfluoropolyether (PFPE) structures, each multidentate PFPE structure including at least two end segments and a middle segment therebetween, wherein the multidentate PFPE structures have a molecular weight that is substantially the same.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 14A is a schematic representation of a perpendicular magnetic recording medium, according to one embodiment.

FIG. 14B is a schematic representation of a magnetic recording head and the perpendicular magnetic recording medium of FIG. 14A, according to one embodiment.

FIG. 14C is a schematic representation of a recording apparatus adapted for recording separately on both sides of the perpendicular magnetic recording medium of FIG. 14A, according to one embodiment.

FIG. 15A is a cross-sectional view of one particular embodiment of a perpendicular magnetic head with helical coils.

FIG. 15B is a cross-sectional view of one particular embodiment of a piggyback magnetic head with helical coils.

FIG. 16A is a cross-sectional view of one particular embodiment of a perpendicular magnetic head with looped coils.

FIG. 16B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several embodiments of magnetic storage systems and/or related systems and methods, as well as operation and/or component parts thereof.

Lubricants may be used in various mechanical devices, including magnetic hard disk drives and other microelectronic mechanical systems. In particular, lubricants may form a lubricant layer when one or more functional groups of the lubricant attach to the surface being lubricated. For instance, lubricants may form a lubricant layer on a magnetic medium (e.g. a magnetic disk) that moves relative to other parts in the mechanic device. Lubricants may thus play an essential role at the head-medium interface in magnetic storage systems by reducing carbon head wear, protecting against organic contamination, and providing additional protection against corrosion of the magnetic layer present in the magnetic medium. In preferred approaches, such lubricants may include functionalized perfluoropolyethers (PFPEs) due to their chemical inertness (especially with regard to oxidation), their thermal stability, and their ability to lower the surface energy of a carbon overcoat present on the upper surface of the magnetic medium.

Figure 1A:
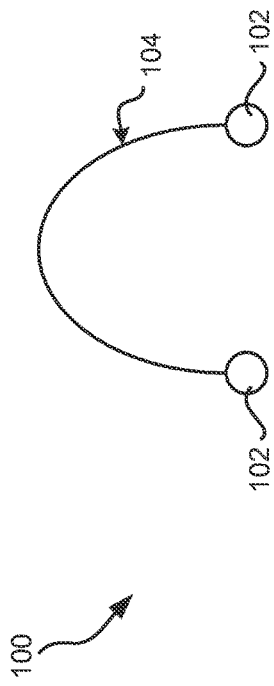
FIG. 1A provides a simplified representation of a lubricant, according to one embodiment.

FIG. 1A provides a simplified representation of a lubricant 100, according to one embodiment. As shown in FIG. 1A, the lubricant 100 includes two end segments 102 and a single perfluoropolyether (PFPE) backbone 104 disposed therebetween. As used herein, a PFPE backbone refers to a continuous segment/portion of a lubricant molecule that includes at least one perfluoropolyalkyl ether unit. In various approaches, a PFPE backbone may also include, in addition to the at least one perfluoropolyalkyl ether unit, one or more fluoroalkyl ether units and/or one or more alkyl ether units, in various approaches. In preferred approaches, each of the end segments 102 may include at least one reactive functional group configured to attach to a surface to be lubricated.

Figure 1B:
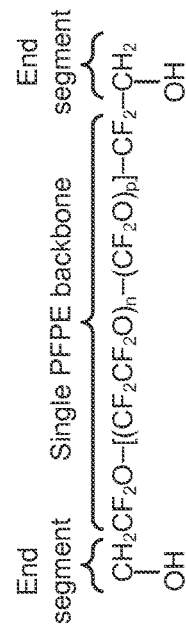
FIG. 1B is a representation of the molecular structure of Zdol.
Figure 1C:
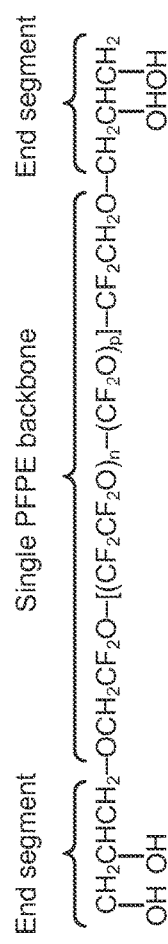
FIG. 1C is a representation of the molecular structure of Ztetraol.

The drive toward higher areal density in magnetic recording necessitates smaller head media spacing (HMS), which scales with bit size. Since lubricant exists at the head-medium interface, reducing the distance that the lubricant's PFPE backbone extends from the surface of the medium is one approach to achieving smaller HMS. Zdol and Ztetraol are examples of perfluoropolyether (PFPE) lubricants having the basic structure shown in FIG. 1A, and which have good clearance properties due to their low molecular weight PFPE backbones. The molecular structures of Zdol and Ztetraol are illustrated in FIGS. 1B and 1C, respectively, with annotations specifying the PFPE backbone and end segments. The "n" and "p" subscripts associated with the —$(CF_2CF_2O)_n$— and —$(CF_2O)_p$— units in the PFPE backbones shown in FIGS. 1B-C each individually correspond to integers greater than zero. As shown in FIGS. 1B-C, Zdol and Ztetraol include one or more —OH functional groups in their respective end segments thereby allowing them to bind to a surface, such as a protective carbon overcoat present on an upper surface of a magnetic recording medium.

While the low molecular weight PFPE backbones of Zdol and Ztetraol may help achieve a small HMS, they may also leave Zdol and Ztetraol susceptible to evaporation issues, as molecular weight inversely and exponentially varies with vapor pressure. Likewise, the low molecular weight associated with PFPE backbones of Zdol and Ztetraol may also lead to spin-off issues, as molecular weight has a linear, inverse relationship with viscosity. Approaches to eliminate and/or reduce these evaporation and spin-off issues may involve increasing the molecular weight of the PFPE backbones associated with Zdol and Ztetraol. For instance, in one particular approach, the single, PFPE backbone in Zdol and Ztetraol may have a high molecular weight greater than or equal to about 3000 amu.

However, long, heavy PFPE backbones in a lubricant, while less prone to evaporation, may create potential head-medium clearance issues. For example, a long, high molecular weight PFPE backbone that is tethered to a surface at both ends has multiple degrees of freedom that may allow a portion (e.g. a middle portion) of the PFPE backbone to lift up from the surface and interact with a magnetic head positioned above. Moreover, long, heavy PFPE backbones may result in lubricant thicknesses that are too large (e.g., about 1.3 nm) to achieve a small HMS.

Figure 2A:
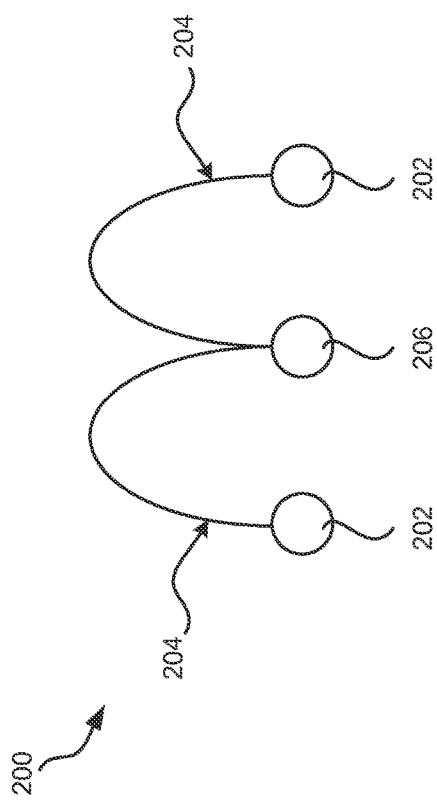
FIG. 2A is a simplified representation of a multidentate lubricant, according to one embodiment.

One approach to address the tradeoff between volatility and high molecular weight (manifesting itself as long free PFPE backbone lengths) may include use of a multidentate lubricant. FIG. 2A provides a simplified representation of a multidentate lubricant 200, according to one embodiment. As shown in FIG. 2A, the multidentate lubricant 200 includes two end segments 202, each of which may have the same or different molecular structure; two PFPE backbones 204, each of which may have the same or different molecular structure; and an inner attachment segment 206. Per the embodiment illustrated in FIG. 2A, each PFPE backbone 204 has an end segment 202 at one end and an inner attachment segment 206 at the opposite end.

In some approaches, the end and inner attachment segments 202, 206 may have the same or different molecular structures. Additionally, the end and/or inner attachment segments 202, 206 may each include one or more reactive functional groups configured to bind to a surface. In particular approaches, each of the one or more reactive functional groups present in the end and/or inner attachment segments 202, 206 may independently be selected from a group consisting of: a hydroxyl group, a piperonyl group, an amine group, a carboxylic acid, a phosphazene group, and combinations thereof. In approaches where the PFPE backbones 204 of the multidentate lubricant 200 may be tethered to a surface via one or more reactive groups present in both the end segments 202 and inner attachment segment 206, the multidentate lubricant 200 may offer better clearance properties than a lubricant of equivalent molecular weight having one or more reactive functional groups present only in end segments (see e.g., lubricant 100 of FIG. 1A).

In various approaches, each PFPE backbone 204 in the multidentate lubricant 200 of FIG. 2A may have the same molecular structure as the PFPE backbone of Ztetraol.

Figure 2B:
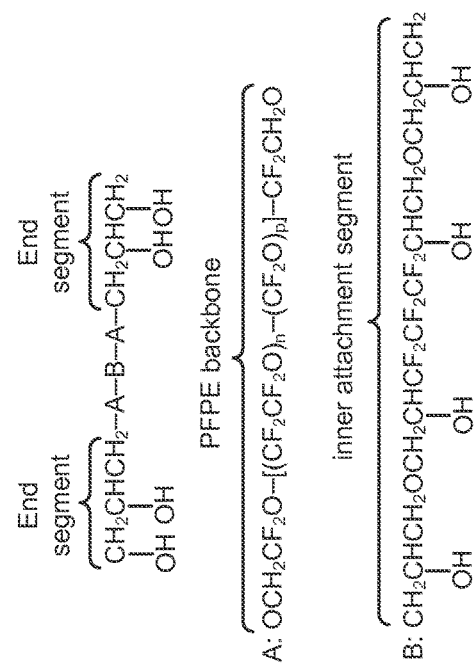
FIG. 2B is a representation of the molecular structure of ZTMD.

One example of a multidentate lubricant having the basic structure shown in FIG. 2A is Ztetraol Multidentate (ZTMD). The molecular structure of ZTMD is illustrated in FIG. 2B, with annotations specifying the end segments, two PFPE backbones, and an inner attachment segment. The "n" and "p" subscripts associated with the $—(CF_2CF_2O)_n—$ and $—(CF_2O)_p—$ units in the PFPE backbones shown in FIG. 2B each individually correspond to integers greater than zero. Each of the PFPE backbones of the ZTMD lubricant may be tethered to a surface via the —OH groups present in both the end segments and inner attachment segment, thereby offering better clearance properties than a lubricant of equivalent molecular weight having only —OH groups present in an end segment such as Ztetraol.

Figure 3:
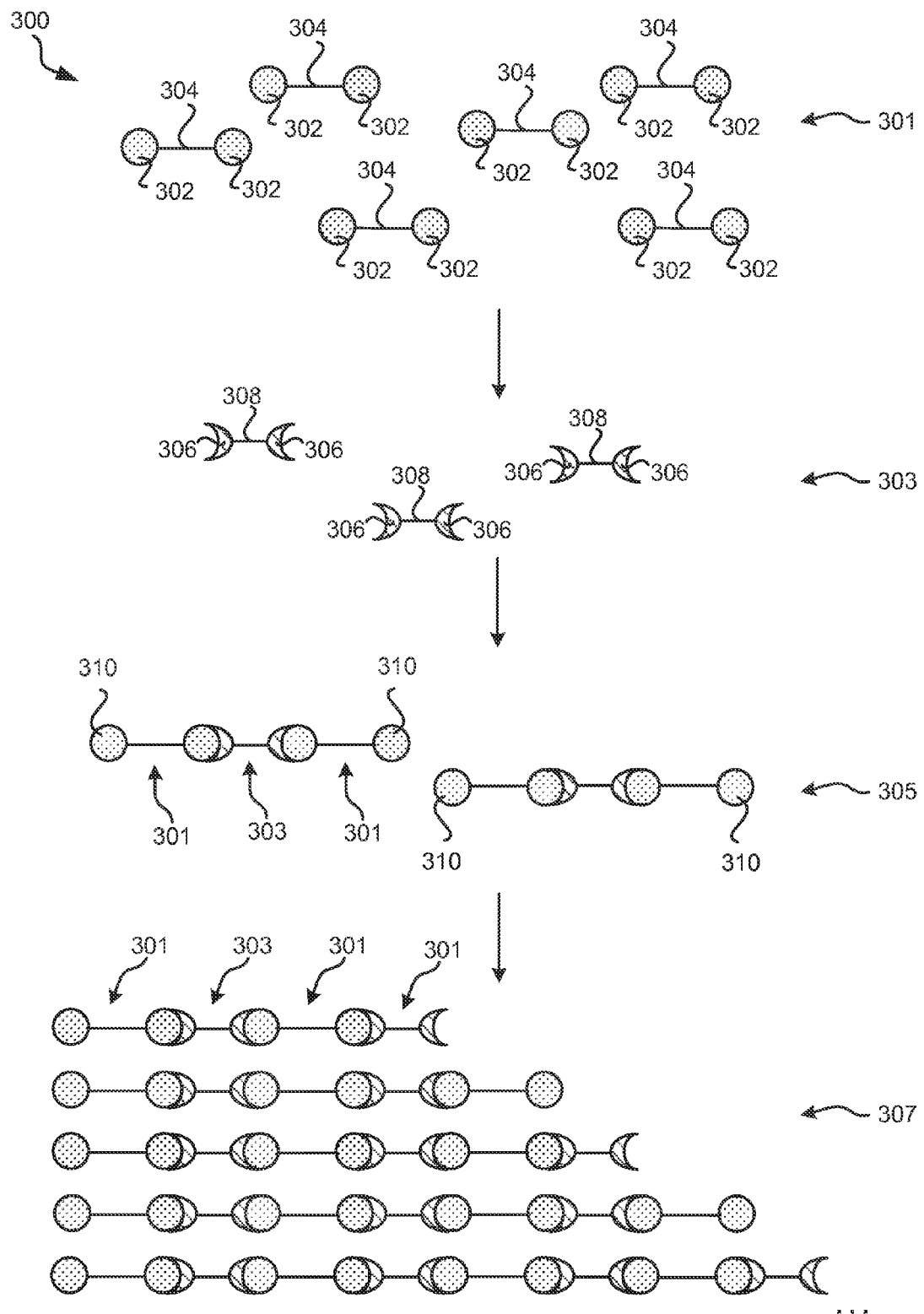
FIG. 3 is a flowchart of a method for forming ZTMD, according to one embodiment.

FIG. 3 illustrates a method 300 for forming ZTMD according to one embodiment. As shown in FIG. 3, the method 300 includes providing a plurality of Ztetraol precursors 301. In various approaches, the plurality of Ztetraol precursors 301 may be purchased, e.g., from Solvay Solexis or synthesized via synthesis techniques known in the art.

Each of the Ztetraol precursors 301 includes two end segments 302 and a single PFPE backbone 304 disposed therebetween. Each end segment 302 includes two reactive hydroxyl groups that are configured to bind to a surface and/or to other reactive groups (e.g., which may be present on a coupling agent, as discussed below). Accordingly, the symmetrical Ztetraol precursors 301 are equally reactive at both ends. For reference, each of the Ztetraol precursors has the molecular structure shown in FIG. 1C.

With continued reference FIG. 3, the method 300 also includes providing a plurality of coupling agent molecules 303, which may be commercially available and/or synthesized using known synthesis techniques. Each of the plurality of coupling agent molecules 303 may have two end segments 306 and a middle segment 308 disposed therebetween. The end segments 306 of the coupling agent molecules 303 may include one or more functional groups configured to react with the end segments 302 (particularly the two reactive hydroxyl functional groups present therein) of the Ztetraol precursors 301. In preferred approaches, each of the coupling agent molecules 303 has the following molecular structure:

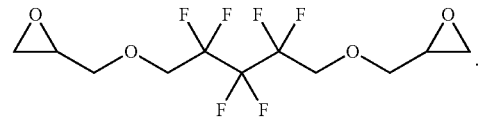 [SMILES: FC(F)(COCC1CO1)C(F)(F)C(F)(F)COCC1CO1]

The method 300 additionally includes reacting approximately two equivalents of the Ztetraol precursors 301 with approximately one equivalent of the coupling agent molecules 303 in a solvent (e.g., Freon-113) in the presence of an acidic catalyst (e.g., a sulfuric acid catalyst) to generate ZTMD molecules 305 in about 15% yield. It is important to note, however, that the end segments 310 of the resulting ZTMD molecules 305 each still include two reactive hydroxyl groups, which may further bind to additional coupling agent molecules 303 present in the solution. Accordingly, one disadvantage of the method 300 is the propensity to form higher molecular weight oligomers. See resulting structures 307. These undesired oligomers may comprise at least 45% of the reaction products. The remainder of the reaction products (about 40%) may contain unreacted Ztetraol precursors and/or partially coupled Ztetraol precursors (i.e., molecules that consist of one Ztetraol precursor 301 bound/coupled to a coupling agent molecule 303).

After water extraction to remove residual sulfuric acid catalyst, the fluorous solvent may be evaporated leaving the resulting crude reaction mixture comprising the ZTMD molecules, the undesired oligomers and the unreacted and/or partially coupled Ztetraol molecules. The method 300 may thus further include isolating the ZTMD molecules via supercritical $CO_2$ ($scCO_2$) extraction or other suitable extraction technique as would become apparent to a skilled artisan upon reading the present disclosure. The major oligomeric byproduct, which is extremely viscous and not suitable as a lubricant, may be discarded. The unreacted and/or partially coupled Ztetraol precursors may be re-used to synthesize more ZTMD molecules according to the steps of method 300 discussed above.

The low yield of ZTMD lubricant formed via method 300 necessitates the purchase or synthesis of large amounts of the Ztetraol precursor 301. The Ztetraol precursor 301 is extremely expensive and subject to dramatic price increases. Further, the need to perform an additional purification step to extract the ZTMD lubricant from the crude reaction mixture may also add to the overall cost and/or time required to generate sufficient quantities of ZTMD.

Embodiments disclosed herein overcome the aforementioned drawbacks by providing a substantially monodisperse lubricant and methods of making the same. In various approaches, the substantially monodisperse lubricants described herein may be particularly useful in magnetic storage systems and component parts thereof, such as magnetic recording media (e.g., hard disks), as well as in other devices (e.g., microelectronics, semiconductors electronics, optoelectronics, memories, solar cells, capacitors, detectors, sensors, etc.).

For instance, according to one general embodiment, a method for forming a substantially monodisperse lubricant includes: providing a plurality of perfluoropolyether (PFPE) precursors, each PFPE precursor including two end segments and a PFPE backbone disposed therebetween; protecting one of the end segments of each PFPE precursor with one or more protecting agents to form a plurality of mono-protected PFPE precursors, each mono-protected PFPE precursor including a protected end segment and an unprotected end segment; and coupling the unprotected end segment of each of the mono-protected PFPE precursors to the unprotected end segment of another of the mono-protected PFPE precursors via a coupling agent to form multidentate PFPE structures.

According to another general embodiment, a substantially monodisperse lubricant includes a plurality of multidentate perfluoropolyether (PFPE) structures, each multidentate PFPE structure including at least two end segments and a middle segment therebetween, wherein the multidentate PFPE structures have a molecular weight that is substantially the same.

Figure 4:
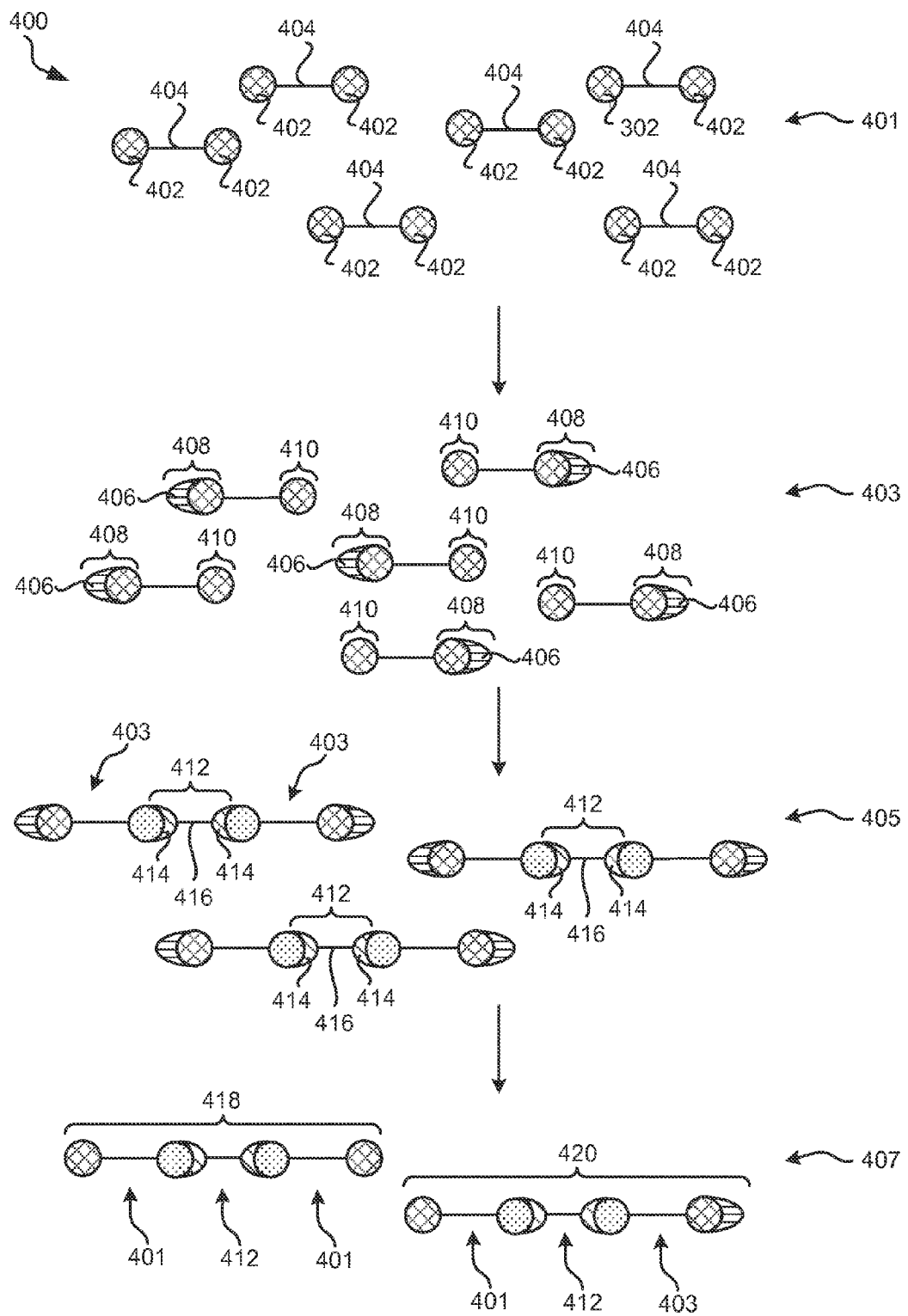
FIG. 4 is a flowchart of a method for forming a substantially monodisperse lubricant, according to one embodiment.

Referring now to FIG. 4, an exemplary method for forming a substantially monodisperse lubricant is shown, according to one embodiment. As used herein, a substantially monodisperse lubricant is lubricant with a polydispersity index in the range from 1 to about 1.5. The polydispersity index corresponds to the molecular weight distribution, specifically the ratio of the weight average molecular weight ($M_w$) to the number average molecular weight ($M_n$). Accordingly, in preferred approaches, the substantially monodisperse lubricant ultimately formed per method 400 includes a plurality of perfluoropolyether (PFPE) structures which may have the same, or substantially the same, molecular weight and/or degree of polymerization.

As an option, the present method 400 may be implemented in conjunction with features from any other embodiment listed herein, such as those described with reference to the other FIGS. Of course, this method 400 and others presented herein may be used to form magnetic structures for a wide variety of devices and/or purposes which may or may not be related to magnetic recording. It should be noted that the method 400 may include more or less steps than those described and/or illustrated in FIG. 4, according to various approaches. It should also be noted that that the method 400 may be carried out in any desired environment.

As shown in FIG. 4, the method 400 includes providing a plurality of PFPE precursors 401, each of the PFPE precursors 401 including two end segments 402 and a PFPE backbone 404 disposed therebetween. In various approaches, the plurality of PFPE precursors 401 may be purchased, e.g., from Solvay Solexis, or synthesized via synthesis techniques known in the art.

In some approaches, the PFPE backbone 404 of at least one of the PFPE precursors 401 may include a perfluoroethyl ether unit represented by:

$$—(CF_2CF_2O)_n—,$$

where n is an integer greater than zero. For instance, in one particular approach, the PFPE backbone 404 of at least one of the PFPE precursors 401 may be represented by:

$$—OCH_2CF_2O—(CF_2CF_2O)_n—(CF_2O)_p—CF_2CH_2O—,$$

wherein n is an integer greater than zero, and p is an integer greater than zero. In another particular approach, the PFPE backbone 404 of at least one of the PFPE precursors 401 may be represented by:

$$—OCH_2CF_2O—(CF_2CF_2O)_n—CF_2CH_2O—,$$

wherein n is an integer greater than zero.

In more approaches, the PFPE backbone 404 of at least one of the PFPE precursors 401 may include a perfluoropropyl ether unit represented by:

$$—(CF_2CF_2CF_2O)_m—,$$

where m is an integer greater than zero. For example, in one particular approach, the PFPE backbone 404 of at least one of the PFPE precursors 401 may be represented by:

$$—OCH_2CF_2CF_2O—(CF_2CF_2CF_2O)_m—CF_2CF_2CH_2O—,$$

where m is an integer greater than zero.

In yet more approaches, the PFPE backbone 404 of at least one of the PFPE precursors 401 may include at a perfluorobutyl ether unit represented by:

$$—(CF_2CF_2CF_2CF_2O)_x—,$$

where x is an integer greater than zero. For instance, in one particular approach, the PFPE backbone 404 of at least one of the PFPE precursors 401 may be represented by:

$$—OCH_2CF_2CF_2CF_2O—(CF_2CF_2CF_2CF_2O)_x—CF_2CF_2CF_2CH_2O—,$$

where x is an integer greater than zero.

In still more approaches, at least two of the PFPE precursors 401 may have a PFPE backbone 404 with the same molecular structure, degree of polymerization, and/or molecular weight. In further approaches, at least two of the PFPE precursors 401 may have PFPE backbones 404 with different molecular structures, degrees of polymerization, and/or molecular weights.

In various approaches, the PFPE backbone 404 of at least one PFPE precursor 401 may have a molecular weight in a range between about 300 amu to about 5000 amu.

In numerous approaches, the end segments 402 of each of the PFPE precursors 401 may include one or more reactive functional groups configured to bind to a surface and/or to other reactive functional groups via a covalent bond, an ionic bond, a hydrogen bond, van der Waals forces, dispersion forces, dipole-dipole interactions, etc. These one or more reactive functional groups may be independently selected from a group consisting of a hydroxyl group, a piperonyl group, an amine group, a phosphazene group, and combinations thereof. In preferred approaches, the one or more reactive functional groups may be a hydroxyl group. It is important to note, however, that for each PFPE precursor 401, the reactive function group(s) in one end segment may be the same or different from the reactive function group(s) in the other end segment.

In some approaches, at least two of the PFPE precursors 401 may include the same reactive functional group(s) bound/coupled to at least one of their respective end segments 402. In other approaches, at least two of the PFPE precursors 401 may include different reactive functional group(s) bound/coupled to at least one of their respective end segments 402.

In one approach, at least one end segment 402 of at least one PFPE precursor 401 may be represented by

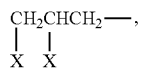

where each X is independently selected from a group consisting of: a hydroxyl group, a piperonyl group, an amine group, a phosphazene group, and combinations thereof.

As also shown in FIG. 4, the method 400 includes protecting one end segment 402 of each of the PFPE precursors 401 with a protecting agent 406 to form a plurality of mono-protected PFPE precursors 403. Consequently, each mono-protected precursor 403 includes a protected end segment 408 and an unprotected end segment 410.

In various approaches, the protecting agent 406 in each protected end segment 408 may be configured to protect at least one of the one or more reactive functional groups present therein (e.g., the reactive functional group(s) bound/coupled to the end segment 402 of each PFPE precursor 401). The protected functional group(s) are thus rendered non-reactive (e.g., not capable of binding to a surface and/or other reactive functional groups). In some approaches, the protecting agent 406 in each protected end segment 408 may be configured to protect all of the reactive functional groups present therein.

In other approaches, the protected end segment 408 may include two or more protecting agents 406. For example, in approaches where there are two or more reactive functional groups present in the end segments 402 of the PFPE precursor 401, these reactive functional groups may each be protected by a separate protecting agent 406.

In more approaches, at least two of the mono-protected PFPE precursors 403 may include, in their respective protected end segments 408, the same number of protecting agents, and/or protecting agent(s) with the same molecular structure. However, in yet more approaches, at least two of the mono-protected PFPE precursors 403 may include, in their respective protected end segments 408, different numbers of protecting agents, and/or protecting agent(s) with different molecular structure.

In preferred approaches, the one or more protecting groups in each protected end segment 408 may be stable (e.g., do not degrade and/or are able to protect the reactive functional groups(s) present therein) in acidic conditions. In particular approaches, the one or more protecting groups may be stable in the presence of a Lewis acid and/or a Brønsted acid.

Figure 5:
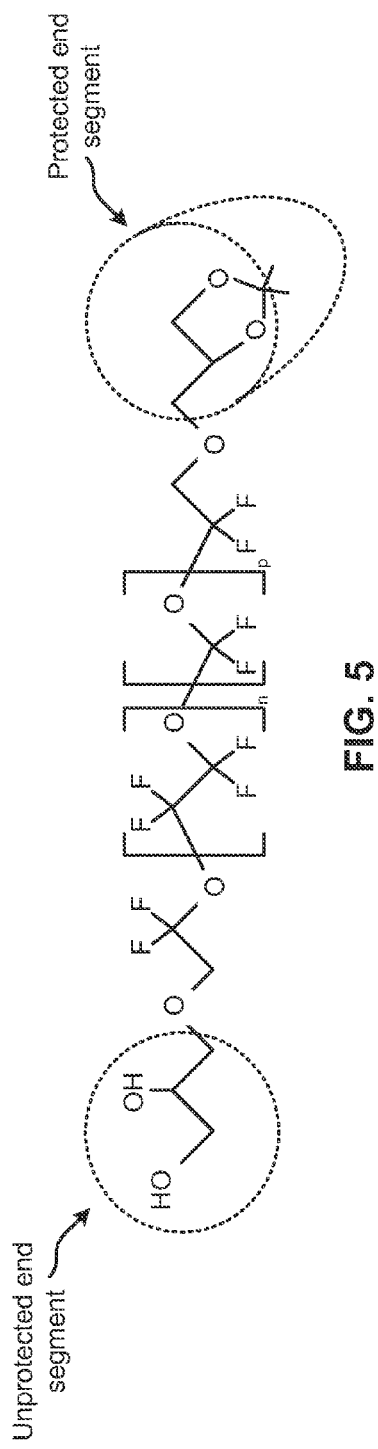
FIG. 5 is a representation of the molecular structure of a mono(acetonide)-protected Ztetraol precursor.
Figure 6:
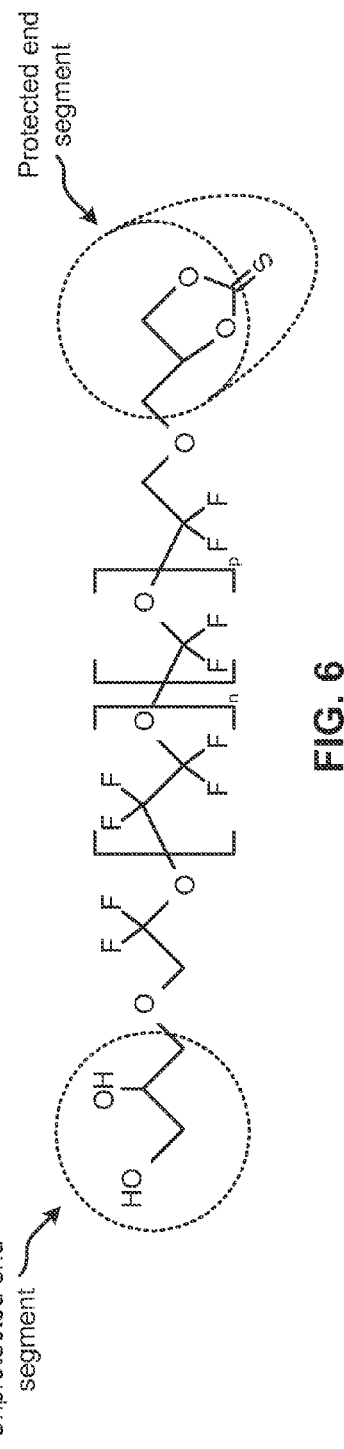
FIG. 6 is a representation of the molecular structure of a mono(thiocarbonate)-protected Ztetraol precursor.
Figure 7:
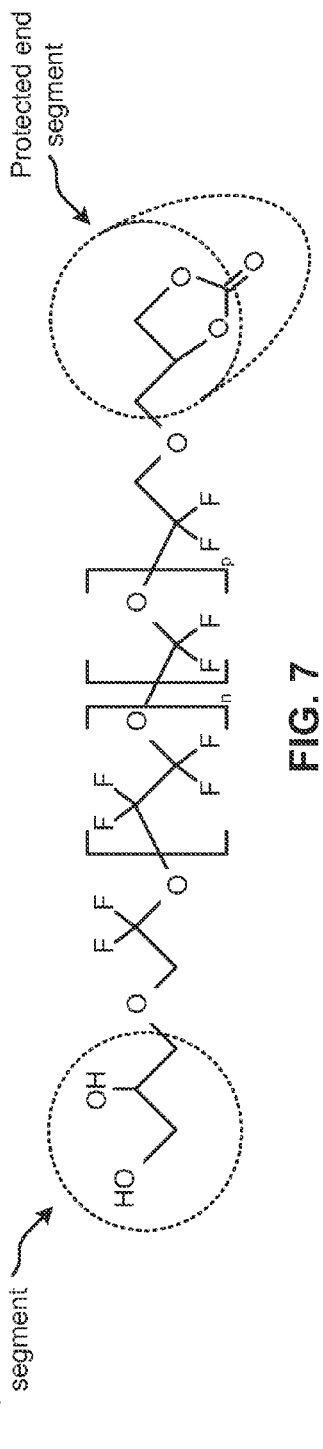
FIG. 7 is a representation of the molecular structure of a mono(carbonate)-protected Ztetraol precursor.

In various approaches, the plurality of mono-protected PFPE precursors 403 may include, but are not limited to, mono(acetonide)-protected PFPE precursors, mono(carbonate)-protected PFPE precursor, mono(thiocarbonate)-protected PFPE precursors, and combinations thereof. FIGS. 5-7 illustrate exemplary embodiments of a mono(acetonide)-protected Ztetraol precursor (FIG. 5), a mono(thiocarbonate)-protected Ztetraol (FIG. 6), precursor, and a mono(carbonate)-protected Ztetraol precursor (FIG. 7).

With continued reference to FIG. 4, the method 400 includes coupling the unprotected end segment 410 of each of the mono-protected PFPE precursors 403 to the unprotected end segment 410 of another of the mono-protected PFPE precursors 403 via a coupling agent 412 to form a plurality of multidentate PFPE structures 405, which have two PFPE backbones 404. In various approaches, the coupling of two mono-protected PFPE precursors 403 together via a coupling agent 412 may occur in a solution, which may preferably include an acidic catalyst.

Each coupling agent 412 includes two end segments 414 and a middle segment 416 disposed therebetween. The end segments 414 of each coupling agent 412 may include one or more functional groups configured to react with other reactive functional groups, such as those present in the unprotected end segments 410 of the mono-protected PFPE precursors 403. In particular approaches, one or more of the coupling agents 412 may have the following molecular structure:

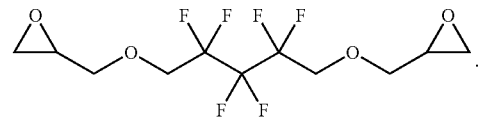

In various approaches, each coupling agent 412 configured to couple two mono-protected PFPE precursors 403 may be the same or different from one another. In other words, at least two of the multidentate PFPE structures 405 may include the same or different coupling agents 412 in some approaches.

As shown in FIG. 4, the multidentate PFPE structures 405 have protected end segments (i.e., one or more protecting agents 406 are present at each end of the multidentate PFPE structures 405). Accordingly, the protected reactive functional group(s) in each protected end segment are prohibited from binding to additional coupling agents 412, therefore precluding formation of undesired higher molecular weight oligomers. This method 400 of forming multidentate PFPE structures may thus offer several advantages over other methods directed to forming such structures, such as method 300 shown in FIG. 3. For instance, as the method 400 avoids formation of undesired oligomeric byproducts, there is no need to implement additional, costly processing steps to remove said byproducts (e.g., via scCO$_2$ fractionation) and purify the desired multidentate PFPE structures.

Moreover, it has been surprisingly and unexpectedly found, that the presence of one or more protecting agents 406 at each end of the multidentate PFPE structures 405 may reduce the volatility thereof compared to PFPE structures without said protecting agents. For example, in approaches where the multidentate PFPE structures 405 are ZTMD molecules, the presence of the one or more protecting agents 406 at each end of the ZTMD molecules may increase the boiling point of ZTMD by at least about 60° C., especially where the protected end segments include a carbonate and/or a thiocarbonate.

In various approaches, at least one protected end segment of the multidentate PFPE structures 405 may be configured to bind to a surface. For instance, one or more of the protecting agents 406 at one or both ends of the multidentate PFPE structures 405 may be configured to not only protect the reactive functional group(s) present in the end segment to which they are attached, but also to attach to a surface. However, while at least one protected end segment of the multidentate PFPE structures 405 may be configured to attach to a surface (e.g., an upper surface of magnetic recording medium), these protected end segments preferably are not configured to bind to the coupling agents 412 and/or to the end segments (protected and/or unprotected) of other multidentate PFPE structures and/or PFPE precursors. As such, these multidentate PFPE structures 405 may be applied to an upper surface of a magnetic medium to form a lubricant layer thereon in some approaches. Application of these multidentate PFPE structures 405 to an upper surface of a magnetic medium may be achieved via dip coating, spin coating, spray coating, and/or other such deposition technique as would become apparent to one skilled in the art upon reading the present disclosure.

Referring still to FIG. 4, for one or more of the multidentate PFPE structures 405, the method 400 may optionally include removing the protecting agent(s) from at least one protected end segment. See resulting structures 407. In some approaches, one or more of the multidentate PFPE structures 405 may have the protecting agent(s) from both protected end segments removed, thereby forming one or more unprotected multidentate PFPE structures 418.

Figure 8:
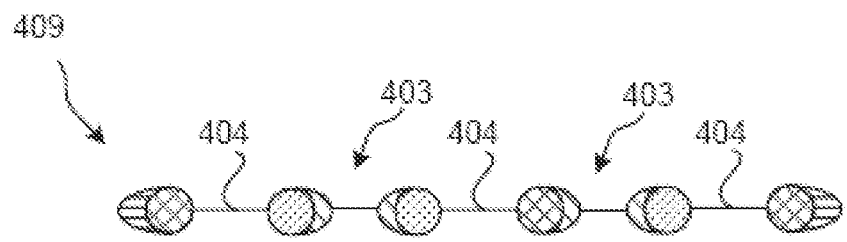
FIG. 8 is a simplified representation of a multidentate lubricant comprising three PFPE backbones, according to one embodiment.

In additional approaches, for one or more of the multidentate PFPE structures 405, the method 400 may optionally include selectively removing the protective agent(s) from only one protected end segment, thereby forming one or more mono-protected multidentate PFPE structures 420. This may be achieved, for example, in approaches where the protected end segments of a multidentate PFPE structure 405 include different protecting agents that are susceptible to different removal processes. Selective removal of the protecting agent(s) from only one protected end segment of a multidentate PFPE structure 405 may allow the unprotected (and reactive) end segment to bind to another unprotected end segment of a mono-protected PFPE precursor 403 via a coupling agent 412, thereby forming a multidentate PFPE structure 409 comprising three PFPE backbones 404 (see e.g., FIG. 8). It is important to note that selectively removing the protecting agent(s) for one protected end segment of a multidentate PFPE structure may enable the formation of PFPE structures comprising any desired number of PFPE backbones.

Figure 9:
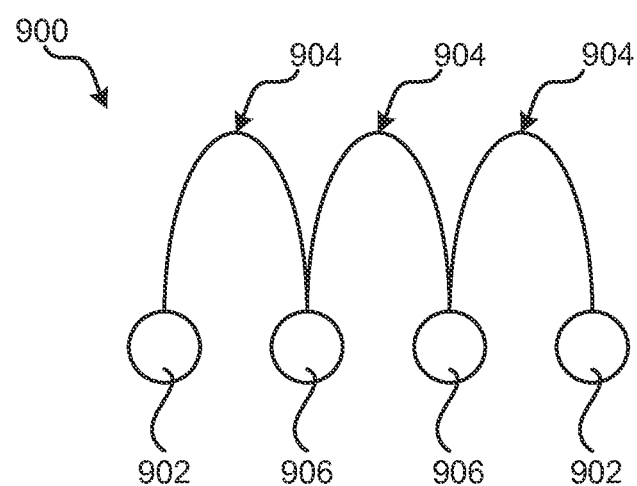
FIG. 9 is a simplified representation of a multidentate PFPE structure comprising three PFPE backbones, according to one embodiment.

A simplified representation of a multidentate PFPE structure 900 comprising three PFPE backbones is shown in FIG. 9, according to one embodiment. As shown in FIG. 9, the multidentate PFPE structure 900 includes two end segments 902, each of which may have the same of different molecular structure; three PFPE backbones 904, each of which may have the same or different molecular structure; and two inner attachment segments 906, each of which may have the same or different molecular structure.

In preferred approaches, the end and inner attachment segments 902, 906 may each include one or more reactive functional groups configured to bind to a surface. In particular approaches, each of the one or more reactive functional groups present in the end and/or inner attachment segments 902, 906 may independently be selected from a group consisting of: a hydroxyl group, a piperonyl group, an amine group, a carboxylic acid, a phosphazene group, and combinations thereof.

In one approach, at least one of the PFPE backbones 904 may include one or more perfluoroethyl ether units. In another approach, at least one of the PFPE backbones 904 may include one or more perfluoropropyl ether units. In yet another approach, at least one of the PFPE backbones 904 may include one or more perfluorobutyl ether units. In particular approaches, at least two of the PFPE backbones 904 may have the same molecular structure, degree of polymerization, and/or molecular weight. In other approaches, at least two of the PFPE backbones 904 may have different molecular structures, degrees of polymerization, and/or molecular weights. In various approaches, each of the PFPE backbones 904 in the multidentate lubricant 900 of FIG. 9 may have the same molecular structure as the PFPE backbone of Ztetraol.

In various approaches, each of the PFPE backbones 904 in the multidentate lubricant 900 of FIG. 9 may have the same molecular structure as the PFPE backbone of Ztetraol.

Figure 10A:
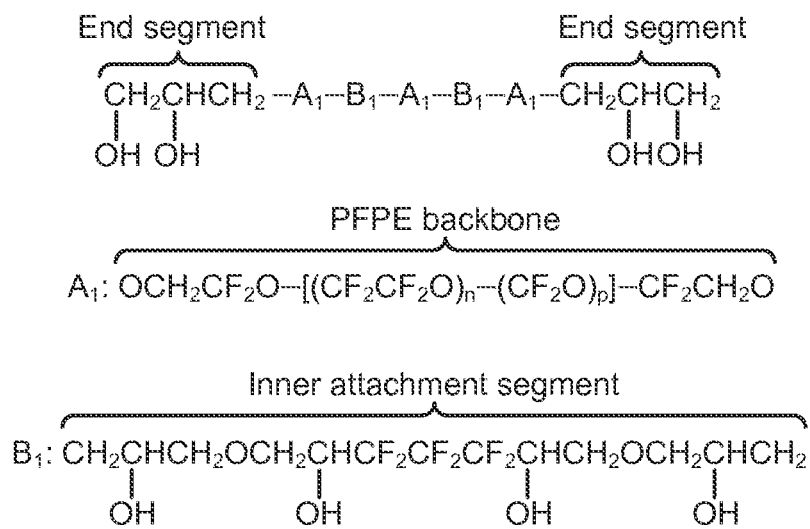
FIGS. 10A-10C are representations of the molecular structure of multidentate PFPE structures comprising three PFPE backbones, according to various embodiments.
Figure 10B:
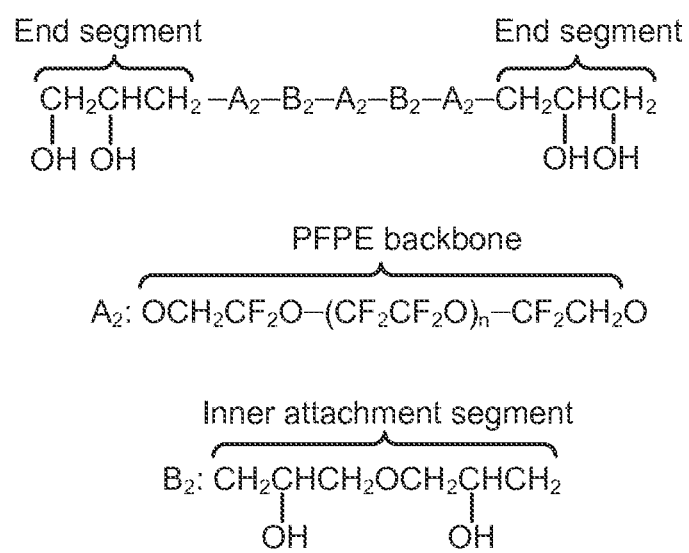
Figure 10C:
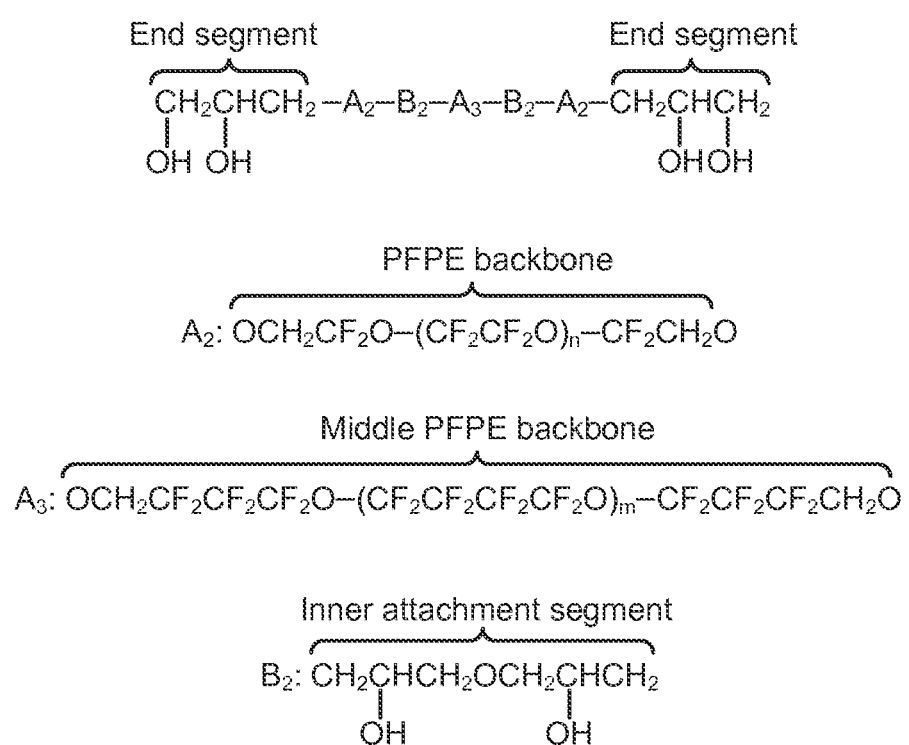

FIGS. 10A-10C illustrate non-limiting examples of multidentate lubricants having the basic structure shown in FIG. 9. Each of the reactive functional groups, denoted by "X" in FIGS. 10A-10C, is configured to attach to a surface to be lubricated and may be independently selected from a group consisting of: a hydroxyl group, a piperonyl group, an amine group, a carboxylic acid, a phosphazene group, and a combination thereof. Moreover, each of the subscripts depicted in FIGS. 10A-10C (e.g., "n", "p" and "m") may each individually represent an integer greater than zero.

Applications/Uses

In various approaches, the multidentate PFPE structures disclosed herein, which may include one protected end segment, two protected end segments, no protected end segment, and combinations thereon, may be used independently or in any combination as lubricants. For example, the resulting multidentate structures disclosed herein may be particularly useful as a lubricant layer in magnetic recording media.

Figure 11:
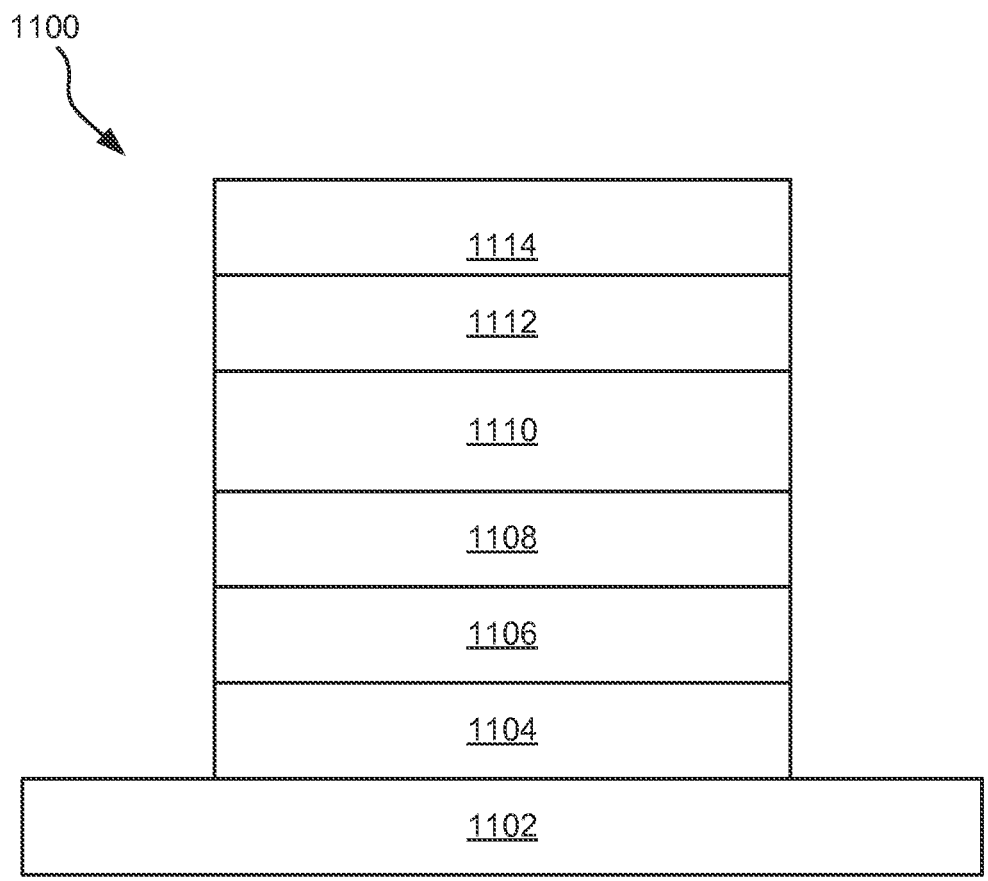
FIG. 11 is a simplified schematic diagram of a magnetic medium, according to one embodiment.

Referring now to FIG. 11, a magnetic recording medium 1100 having a lubricant layer is shown, according to one embodiment. The magnetic recording medium 1100 may be any type of magnetic media known in the art, such as a hard disk, a magnetic tape, an optical disk, etc. As an option, the magnetic recording medium 1100 may be implemented in conjunction with features from any other embodiment listed herein, such as those described with reference to the other FIGS. Of course, the magnetic recording medium 1100 and others presented herein may be used in various applications and/or in permutations which may or may not be specifically described in the illustrative embodiments listed herein. Moreover, more or less layers than those specifically described in FIG. 11 may be included in the magnetic recording medium 1100 according to various embodiments.

As shown in FIG. 1I, the magnetic recording medium 1100 includes a non-magnetic substrate 1102, which may include glass, ceramic materials, glass/ceramic mixtures, AlMg, silicon, silicon-carbide, or other substrate material suitable for use in magnetic recording media as would be recognized by one having skill in the art upon reading the present disclosure.

As also shown in FIG. 11, the magnetic recording medium 1100 may also include an optional adhesion layer 1104 above the substrate 1102 to promote coupling of layers formed thereabove. The magnetic recording medium 1100 may additionally include one or more optional soft magnetic underlayers 1106 positioned above the substrate 1102 and optional adhesion layer 1104 if present. The one or more optional soft magnetic underlayers 1106 may be configured to promote data recording in a magnetic recording layer positioned thereabove. In particular approaches, the optional soft magnetic underlayer(s) 1106 may include a material having a high magnetic permeability. Suitable materials for the soft magnetic underlayer(s) may include, but are not limited to, Fe, FeNi, FeCo, a Fe-based alloy, a FeNi-based alloy, a FeCo-based alloy, Co-based ferromagnetic alloys, and combinations thereof. In some approaches, the optional soft magnetic underlayer may include a single layer structure or a multilayer structure. For instance, one example of a multilayer soft magnetic underlayer structure may include a coupling layer (e.g., including Ru) sandwiched between one or more soft magnetic underlayers, where the coupling layer is configured to induce an anti-ferromagnetic coupling between one or more soft magnetic underlayers.

As further shown in FIG. 11, the magnetic recording medium 1100 may include an exchange break layer 1108 positioned above the soft magnetic underlayer 1106. The exchange break layer 1108 may be configured to promote ordered growth of the magnetic recording layer 1110 positioned thereabove. In various approaches, the exchange break layer 1108 may include at least one of: Ru; Ti; Re; Ru; Os; Cr; alloys of Ru, Ti, Re, Ru, Os, and Cr; or other such suitable material as would be understood by one having skill in the art upon reading the present disclosure. In an optional approach, the exchange break layer 1108 may be formed directly on a seed layer (not shown in FIG. 11), which may include Ni, Cr, W, Ta, and alloys thereof.

The magnetic recording layer 1110, which is positioned above the exchange break layer 1108, may include a plurality of ferromagnetic grains. The magnetic recording layer material may include, but is not limited to, Cr, Fe, Ta, Ni, Mo, Pt, W, Cr, Ru, Ti, Si, O, V, Nb, Ge, B. Pd, and combinations thereof. The magnetic recording layer material may also include alloys comprising at least two of Co, Pt, Cr, Nb, and Ta, in some approaches. The magnetic recording layer may also be a multilayer film in more approaches, for example with Co and Pd or Pt being alternately layered. Regardless of how many magnetic recording layers are included in the magnetic recording layer, preferably all of the magnetic recording layers may have a similar magnetic grain pitch. The magnetic grain pitch may be due to the conformal growth of the lowermost magnetic recording layer that is transferred to the magnetic layers formed there above.

Individual magnetic grains and/or magnetic islands (e.g., comprised of a plurality of magnetic grains) in the magnetic recording layer 1110 may be separated by a segregant. The segregant may include oxides and/or nitrides of Ta, W, Nb, V, Mo, B, Si, Co, Cr, Ti, Al, etc., or C or Cr or any suitable non-magnetic segregant material known in the art.

In preferred approaches, the magnetic recording medium 1100 may be a perpendicular recording medium, thus the direction of magnetization of the magnetic recording layer will be in a direction substantially perpendicular to the recording layer surface. Moreover, the magnetic recording medium 1100 may be also be particularly useful as a patterned magnetic recording medium (e.g., bit patterned magnetic recording medium).

The magnetic recording medium 1100 may include one or more optional capping layers (not shown in FIG. 11) above the magnetic recording layer 1110, in some approaches. The one or more capping layers may be configured to mediate the intergranular coupling of the magnetic grains present in the magnetic recording layer. The optional one or more capping layers may include, for example, a Co-, CoCr-, CoPtCr-, and/or CoPtCrB-based alloy, or other material suitable for use in a capping layer as would be recognized by one having skill in the art upon reading the present disclosure.

As shown in FIG. 11, the magnetic recording medium 1100 may also include a protective overcoat layer 1112 positioned above the magnetic recording layer 1110 and/or the one or more capping layers if present. The protective overcoat layer 1112 may be configured to protect the underlying layers from wear, corrosion, etc. This protective overcoat layer 1112 may be made of, for example, diamond-like carbon, carbon nitride, Si-nitride. BN or B4C, etc. or other such materials suitable for a protective overcoat as would be understood by one having skill in the art upon reading the present disclosure.

The magnetic recording medium 1100 may additionally include a lubricant layer 1114 positioned above the protective overcoat layer 1112. In various approaches, the lubricant layer may include a monodisperse, or substantially monodisperse, lubricant. For instance, in such approaches, the lubricant layer 1114 may include a plurality of multidentate PFPE structures which may have substantially the same molecular weight and/or degree of polymerization. Each of these multidentate PFPE structures may have two end segments and a middle segment disposed therebetween.

In some approaches, at least one end segment of at least one multidentate PFPE structure may be represented by:

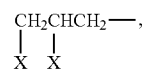

wherein each X is independently selected from a group consisting of: a hydroxyl group, a piperonyl group, an amine group, a phosphazene group, and a combination thereof.

In more approaches, the middle segment of at least one multidentate PFPE structure may include at least two PFPE backbones coupled together via a coupling agent. In various approaches, these at least two PFPE backbones may have the same or different molecular weights, molecular structure, and/or degree of polymerization.

In one particular approach, at least one of the PFPE backbones may be represented by:

where n is an integer greater than zero. In another particular approach, at least one of the PFPE backbones may be represented by:

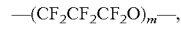

where m is an integer greater than zero. In yet another particular approach, at least one of the PFPE backbones may be represented by:

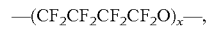

where x is an integer greater than zero. It is important to note that in various approaches, the PFPE backbones may include any combination of the perflouropolyalkyl ether units described herein.

In yet more approaches, the middle segment of at least one multidentate PFPE structure may be represented by:

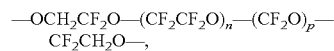

where n is an integer greater than zero, and where p is an integer greater than zero.

In still more approaches, the middle segment of at least one multidentate PFPE structure may include at least three PFPE backbones.

In further approaches, the end segments of at least one multidentate PFPE structure may include at least one reactive functional group configured to attach to a surface. In one approach, this at least one reactive functional group may be selected from a group consisting of: a hydroxyl group, a piperonyl group, an amine group, a carboxylic acid, a phosphazene group, and a combination thereof. In preferred approaches, the at least one reactive functional group may be a hydroxyl.

In numerous approaches, at least one of the multidentate PFPE structures included in the lubricant layer 1114 may have the molecular structure as shown in FIG. 2B (i.e., ZTMD), FIG. 9, and/or FIG. 10. In more approaches, the plurality of PFPE structures may include any combination of the PFPE structures disclosed herein.

In additional approaches, at least one end segment of at least one of the multidentate PFPE structures may include at least one protecting agent. For instance, in such approaches, at least one multidentate PFPE structure may have one or more protecting agents bound/coupled to one or both of its end segments. Accordingly, in some approaches, the plurality of multidentate PFPE structures may include those with both end segments protected, those with only one end segment protected, and/or those with no protected end segments. In some approaches, the one or more protecting agents may include an acetonide, a carbonate, a thiocarbonate, or other suitable protecting agent as would become apparent to one having skill in the art upon reading the present disclosure.

Referring again to FIG. 11, the formation of the magnetic recording medium 1100 may be achieved via known deposition and processing techniques. For instance, deposition one or more of the layers (e.g., the adhesion layer 1104, the soft magnetic underlayer 1106, the exchange break layer 1108, the one or more magnetic recording layers 1110, the protective overcoat layer 1112, etc.) present in the magnetic recording medium 1100 may be achieved via DC magnetron sputtering, RF magnetron sputtering, molecular beam epitaxy, etc., or other such techniques as would become apparent to one having skill in the art upon reading the present disclosure.

In various approaches, the lubricant layer 1114 may be formed on the magnetic recording medium 1100, specifically on the protective overcoat 1112, via a dip coating method. For instance, in one approach, the magnetic recording medium 1100 having the protective overcoat 1112 thereon may be dipped into a lubricant bath including the multidentate PFPE structures disclosed herein and a fluorocarbon solvent such as Vertrel-XF. After a predetermined amount of time, the magnetic recording medium 1100 may be removed from the lubricant bath at a controlled rate. The solvent may then evaporate, leaving behind a lubricant layer 1114 comprising the multidentate PFPE lubricant. The percentage of the multidentate PFPE lubricant remaining on the surface of the magnetic recording medium 1100 after lubrication may refer to the bonded percentage. The bonding percentage may be quantified for various time periods by exposing the lubricated magnetic medium with the solvent used in the lubricant bath. In some approaches, the bonding percentage for the multidentate PFPE structures disclosed herein may be between about 80% to about 95%.

The thickness of the lubricant layer 1114 may be tuned by controlling the submergence duration of the magnetic recording medium 1100 in the lubricant bath, the rate at which the magnetic recording medium 1100 is removed from the coating solution, and/or the concentration of the lubricant (e.g. the multidentate PFPE lubricant) in the lubricant bath. In some approaches, the concentration of the multidentate PFPE lubricant in the lubricant bath may be selected so as to achieve a resulting lubricant layer with a thickness between about 7 Å to about 13 Å.

It is important to note that formation of the lubricant layer 1114 on the surface of the magnetic recording medium 1100, specifically on the surface of the protective overcoat 1112, is not limited to dip coating, but may also involve spin coating, spray coating, a vapor deposition, combinations thereof, or any other suitable coating process as would become apparent to one having skill in the art upon reading the present disclosure.

In further approaches, the magnetic recording medium 1100 shown in FIG. 11 may be a component in a magnetic data storage system. This magnetic data storage may also include at least one magnetic head, a drive mechanism for passing the magnetic recording medium 1100 over the at least one magnetic head, and a controller electrically coupled to the at least one magnetic head for controlling operation of the at least one magnetic head.

Figure 12:
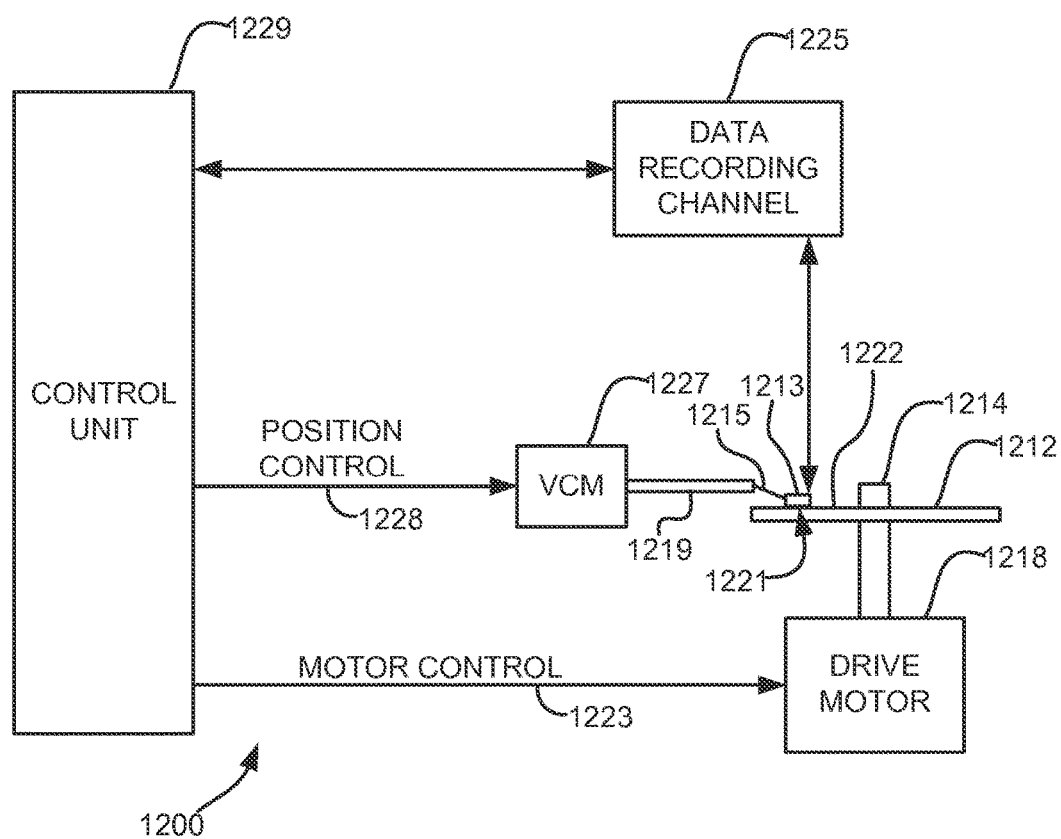
FIG. 12 is a simplified schematic of a magnetic recording disk drive system, according to one embodiment.

For instance, FIG. 12 shows one embodiment of a magnetic disk drive 1200 that may operate with a magnetic recording medium, such as the magnetic recording medium 1100 of FIG. 11. As shown in FIG. 12, at least one rotatable magnetic medium (e.g., magnetic disk) 1212 is supported on a spindle 1214 and rotated by a drive mechanism, which may include a disk drive motor 1218. The magnetic recording on each disk is typically in the form of an annular pattern of concentric data tracks (not shown) on the disk 1212. Thus, the disk drive motor 1218 preferably passes the magnetic disk 1212 over the magnetic read/write portions 1221, described immediately below.

At least one slider 1213 is positioned near the disk 1212, each slider 1213 supporting one or more magnetic read/write portions 1221, e.g., of a magnetic head according to any of the approaches described and/or suggested herein. As the disk rotates, slider 1213 is moved radially in and out over disk surface 1222 so that portions 1221 may access different tracks of the disk where desired data are recorded and/or to be written. Each slider 1213 is attached to an actuator arm 1219 by means of a suspension 1215. The suspension 1215 provides a slight spring force which biases slider 1213 against the disk surface 1222. Each actuator arm 1219 is attached to an actuator 1227. The actuator 1227 as shown in FIG. 12 may be a voice coil motor (VCM). The VCM comprises a coil movable within a fixed magnetic field, the direction and speed of the coil movements being controlled by the motor current signals supplied by controller 1229.

During operation of the disk storage system, the rotation of disk 1212 generates an air bearing between slider 1213 and disk surface 1222 which exerts an upward force or lift on the slider. The air bearing thus counter-balances the slight spring force of suspension 1215 and supports slider 1213 off and slightly above the disk surface by a small, substantially constant spacing during normal operation. Note that in some embodiments, the slider 1213 may slide along the disk surface 1222.

The various components of the disk storage system are controlled in operation by control signals generated by controller 1229, such as access control signals and internal clock signals. Typically, control unit 1229 comprises logic control circuits, storage (e.g., memory), and a microprocessor. In a preferred approach, the control unit 1229 is electrically coupled (e.g., via wire, cable, line, etc.) to the one or more magnetic read/write portions 1221, for controlling operation thereof. The control unit 1229 generates control signals to control various system operations such as drive motor control signals on line 1223 and head position and seek control signals on line 1228. The control signals on line 1228 provide the desired current profiles to optimally move and position slider 1213 to the desired data track on disk 1212. Read and write signals are communicated to and from read/write portions 1221 by way of recording channel 1225.

The above description of a typical magnetic disk storage system, and the accompanying illustration of FIG. 12 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers of the write portion by a gap layer at or near a media facing side of the head (sometimes referred to as an ABS in a disk drive). The pole piece layers may be connected at a back gap. Currents are conducted through the coil layer, which produce magnetic fields in the pole pieces. The magnetic fields fringe across the gap at the media facing side for the purpose of writing bits of magnetic field information in tracks on moving media, such as in circular tracks on a rotating magnetic disk.

The second pole piece layer has a pole tip portion which extends from the media facing side to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 13A:
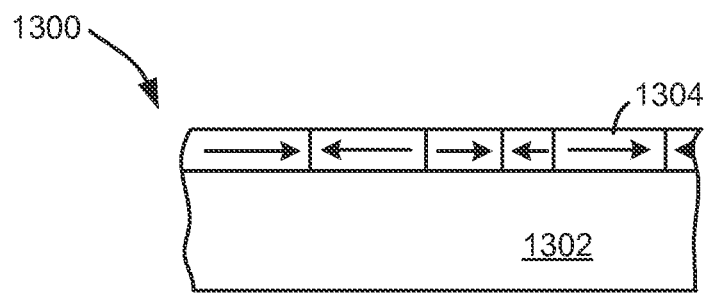
FIG. 13A is a schematic representation of a longitudinal magnetic recording medium, according to one embodiment.

FIG. 13A provides a schematic illustration of a longitudinal recording medium 1300 which may be used with magnetic disc recording systems, such as that shown in FIG. 12. This longitudinal recording medium 1300 is utilized for recording magnetic impulses in (or parallel to) the plane of the medium itself. This longitudinal recording medium 1300, which may be a recording disc in various approaches, comprises at least a supporting substrate 1302 of a suitable non-magnetic material such as glass, and a conventional magnetic recording layer 1304 positioned above the substrate.

Figure 13B:
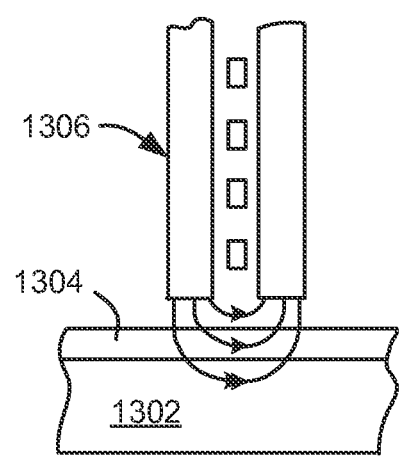
FIG. 13B is a schematic representation of a magnetic recording head and the longitudinal magnetic recording medium of FIG. 13A, according to one embodiment.

FIG. 13B shows the operative relationship between a recording/playback head 1306, which may preferably be a thin film head and/or other suitable head as would be recognized by one having skill in the art upon reading the present disclosure, and the longitudinal recording medium 1300 of FIG. 13A.

Improvements in longitudinal recording media have been limited due to issues associated with thermal stability and recording field strength. Accordingly, pursuant to the current push to increase the areal recording density of recording media, perpendicular recording media (PMR) has been developed. FIG. 14A provides a schematic diagram of a simplified perpendicular recording medium 1400, which may also be used with magnetic disc recording systems, such as that shown in FIG. 12. As shown in FIG. 14A, the perpendicular recording medium 1400, which may be a recording disc in various approaches, comprises at least a supporting substrate 1402 of a suitable non-magnetic material (e.g., glass, aluminum, etc.), and a soft magnetic underlayer 1404 of a material having a high magnetic permeability positioned above the substrate 1402. The perpendicular recording medium 1400 also includes a magnetic recording layer 1406 positioned above the soft magnetic underlayer 1404, where the magnetic recording layer 1406 preferably has a high coercivity relative to the soft magnetic underlayer 1404. There may one or more additional layers (not shown), such as an "exchange-break" layer or "interlayer", between the soft magnetic underlayer 1404 and the magnetic recording layer 1406.

The orientation of magnetic impulses in the magnetic recording layer 1406 is substantially perpendicular to the surface of the recording layer. The magnetization of the soft magnetic underlayer 1404 is oriented in (or parallel to) the plane of the soft magnetic underlayer 1404. As particularly shown in FIG. 14A, the in-plane magnetization of the soft magnetic underlayer 1404 may be represented by an arrow extending into the paper.

FIG. 14B illustrates the operative relationship between a perpendicular head 1408 and the perpendicular recording medium 1400 of in FIG. 14A. As shown in FIG. 14B, the magnetic flux 1410, which extends between the main pole 1412 and return pole 1414 of the perpendicular head 1408, loops into and out of the magnetic recording layer 1406 and soft magnetic underlayer 1404. The soft magnetic underlayer 1404 helps focus the magnetic flux 1410 from the perpendicular head 1408 into the magnetic recording layer 1406 in a direction generally perpendicular to the surface of the magnetic medium. Accordingly, the intense magnetic field generated between the perpendicular head 1408 and the soft magnetic underlayer 1404, enables information to be recorded in the magnetic recording layer 1406. The magnetic flux is further channeled by the soft magnetic underlayer 1404 back to the return pole 1414 of the head 1408.

As noted above, the magnetization of the soft magnetic underlayer 1404 is oriented in (parallel to) the plane of the soft magnetic underlayer 1404, and may be represented by an arrow extending into the paper. However, as shown in FIG. 14B, this in plane magnetization of the soft magnetic underlayer 1404 may rotate in regions that are exposed to the magnetic flux 1410.

FIG. 14C illustrates one embodiment of the structure shown in FIG. 14B, where soft magnetic underlayers 1404 and magnetic recording layers 1406 are positioned on opposite sides of the substrate 1402, along with suitable recording heads 1408 positioned adjacent the outer surface of the magnetic recording layers 1406, thereby allowing recording on each side of the medium.

FIG. 15A is a cross-sectional view of a perpendicular magnetic head. In FIG. 15A, helical coils 1510 and 1512 are used to create magnetic flux in the stitch pole 1508, which then delivers that flux to the main pole 1506. Coils 1510 indicate coils extending out from the page, while coils 1512 indicate coils extending into the page. Stitch pole 1508 may be recessed from the ABS 1518. Insulation 1516 surrounds the coils and may provide support for some of the elements. The direction of the media travel, as indicated by the arrow to the right of the structure, moves the media past the lower return pole 1514 first, then past the stitch pole 1508, main pole 1506, trailing shield 1504 which may be connected to the wrap around shield (not shown), and finally past the upper return pole 1502. Each of these components may have a portion in contact with the ABS 1518. The ABS 1518 is indicated across the right side of the structure.

Perpendicular writing is achieved by forcing flux through the stitch pole 1508 into the main pole 1506 and then to the surface of the disk positioned towards the ABS 1518.

FIG. 15B illustrates a piggyback magnetic head having similar features to the head of FIG. 15A. Two shields 1504, 1514 flank the stitch pole 1508 and main pole 1506. Also sensor shields 1522, 1524 are shown. The sensor 1526 is typically positioned between the sensor shields 1522, 1524.

FIG. 16A is a schematic diagram of one embodiment which uses looped coils 1610, sometimes referred to as a pancake configuration, to provide flux to the stitch pole 1608. The stitch pole then provides this flux to the main pole 1606. In this orientation, the lower return pole is optional. Insulation 1616 surrounds the coils 1610, and may provide support for the stitch pole 1608 and main pole 1606. The stitch pole may be recessed from the ABS 1618. The direction of the media travel, as indicated by the arrow to the right of the structure, moves the media past the stitch pole 1608, main pole 1606, trailing shield 1604 which may be connected to the wrap around shield (not shown), and finally past the upper return pole 1602 (all of which may or may not have a portion in contact with the ABS 1618). The ABS 1618 is indicated across the right side of the structure. The trailing shield 1604 may be in contact with the main pole 1606 in some embodiments.

FIG. 16B illustrates another type of piggyback magnetic head having similar features to the head of FIG. 16A including a looped coil 1610, which wraps around to form a pancake coil. Also, sensor shields 1622, 1624 are shown. The sensor 1626 is typically positioned between the sensor shields 1622, 1624.

In FIGS. 15B and 16B, an optional heater is shown near the non-ABS side of the magnetic head. A heater (Heater) may also be included in the magnetic heads shown in FIGS. 15A and 16A. The position of this heater may vary based on design parameters such as where the protrusion is desired, coefficients of thermal expansion of the surrounding layers, etc.

Except as otherwise described herein with reference to the various inventive embodiments, the various components of the structures of FIGS. 12-16B, and of other embodiments disclosed herein, may be of conventional material(s), design, and/or fabricated using conventional techniques, as would be understood by one skilled in the art upon reading the present disclosure.

Experimental Results

The following experimental results pertain to illustrative embodiments of the novel magnetic recording media disclosed herein, particularly those which include a lubricant layer comprising substantially monodisperse multidentate PFPE structures/polymers. It is important to note that the following illustrative embodiments do not limit the invention in anyway. It should also be understood that variations and modifications of these illustrative embodiments may be made by those skilled in the art without departing from the spirit and scope of the invention.

Figure 17:
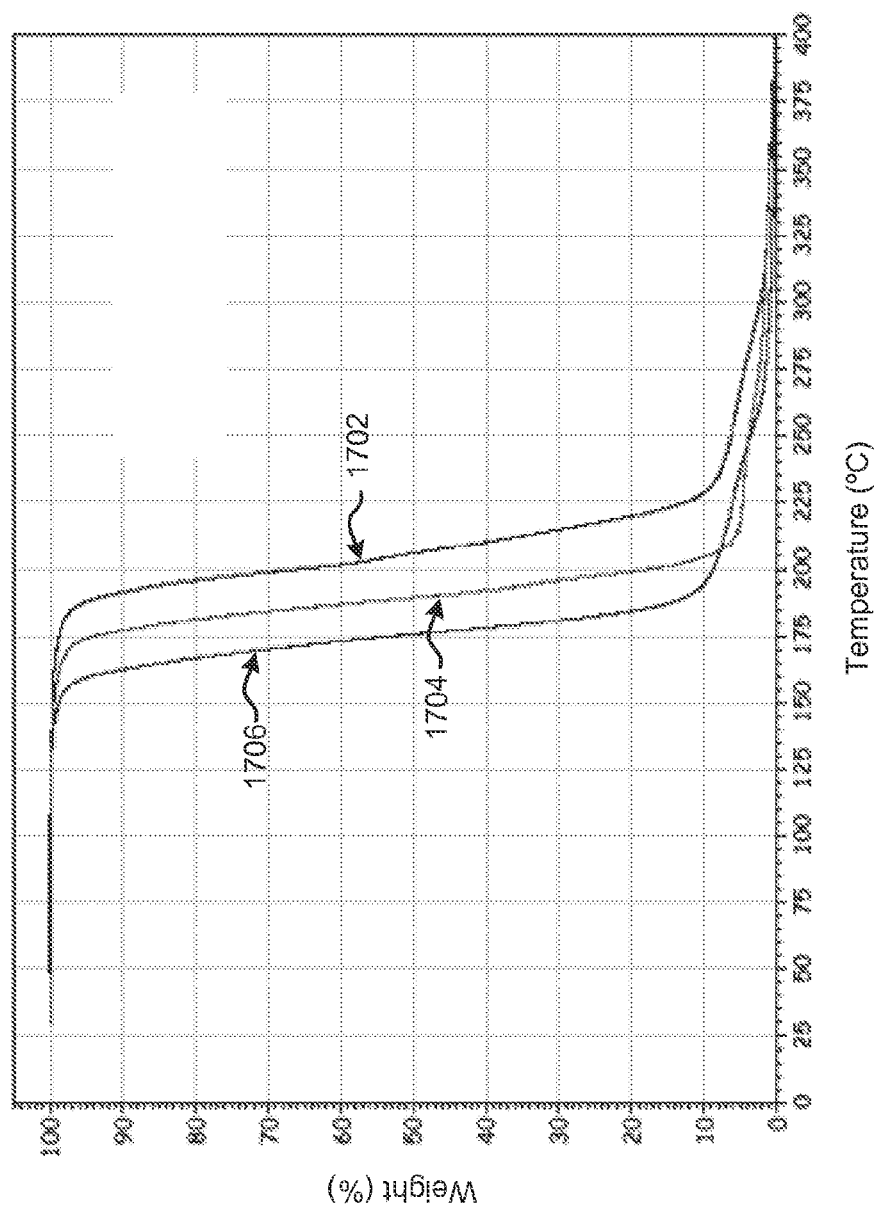
FIG. 17 is a plot illustrating the thermal gravimetric analysis (TGA) of Ztetraol-GT 1200, Ztetraol monoacetonide, and Ztetraol diacetonide.

In one illustrative embodiment, Ztetraol-GT (Solvay Solexis; $M_w$=1200 g·mol$^{-1}$, 5.00 g, 4.17 mmol, 1 eq.) was dissolved in 1,2-dichloro-1,1,3,3,3-pentafluoropropane (Asahiklin AK 225; 7.7 ml). To this solution was added 2,2-dimethoxypropane (FW=104.15 g·mol$^{-1}$, 956 µl, 0.813 g, 7.80 mmol, 1.9 eq.) and Amberlyst-15(H$^+$) (1.3 g). The reaction mixture was stirred at room temperature for 15 h, and the catalyst was removed by filtration. The Ztetraol in the crude reaction mixture was shown to have an average percent acetonide protection of about 61% by $^1$H-NMR spectroscopy. Ztetraol monoacetonide (FIG. 5) was purified by normal-phase column chromatography (100 g silica gel, 60-200 mesh, 60 Å pore size) under isocratic step conditions (300 ml of 1% methanol/dichloromethane balance, then 300 ml 2% methanol/dichloromethane balance, then 400 ml 3% methanol/dichloromethane balance, then 600 ml 5% methanol/dichloromethane balance) to yield 0.93 g of product as a colorless oil (0.75 mmol, 18% yield; the theoretical maximum yield is 50% since the best-case statistical distribution of products is expected to result in 25% unreacted Ztetraol, 50% Ztetraol monoacetonide, and 25% Ztetraol diacetonide). Also isolated in an earlier fraction was 2.8 g of the less polar Ztetraol diacetonide (2.26 mmol, 54% yield). The isolated Ztetraol monoacetonide and Ztetraol diacetonide were analyzed by $^1$H-NMR spectroscopy and shown to have 49% and 100% acetonide protection, respectively. The thermal gravimetric analysis (TGA) of Ztetraol-GT 1200 (1702), Ztetraol monoacetonide (1704), and Ztetraol diacetonide (1706) are shown in FIG. 17. TGA measures the mass change of the sample as a function of temperature, allowing the identity and percentage of each chemical species present to be inferred based upon its known boiling point. Acetonide protection of one or both of the diol end groups of Ztetraol reduces the extent of intermolecular hydrogen bonding between the protected Ztetraol molecules and decreases their boiling points.

In an extension of this embodiment, Ztetraol monoacetonide ($M_w$=1240 g·mol$^{-1}$, 0.222 g, 0.179 mmol, 2.86 eq.) was added to the diepoxide coupling agent possessing the following structure:

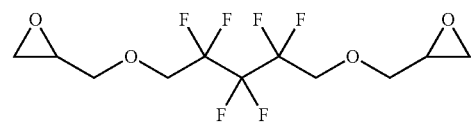 [SMILES: FC(F)(COCC1CO1)C(F)(F)C(F)(F)COCC1CO1]

Figure 18:
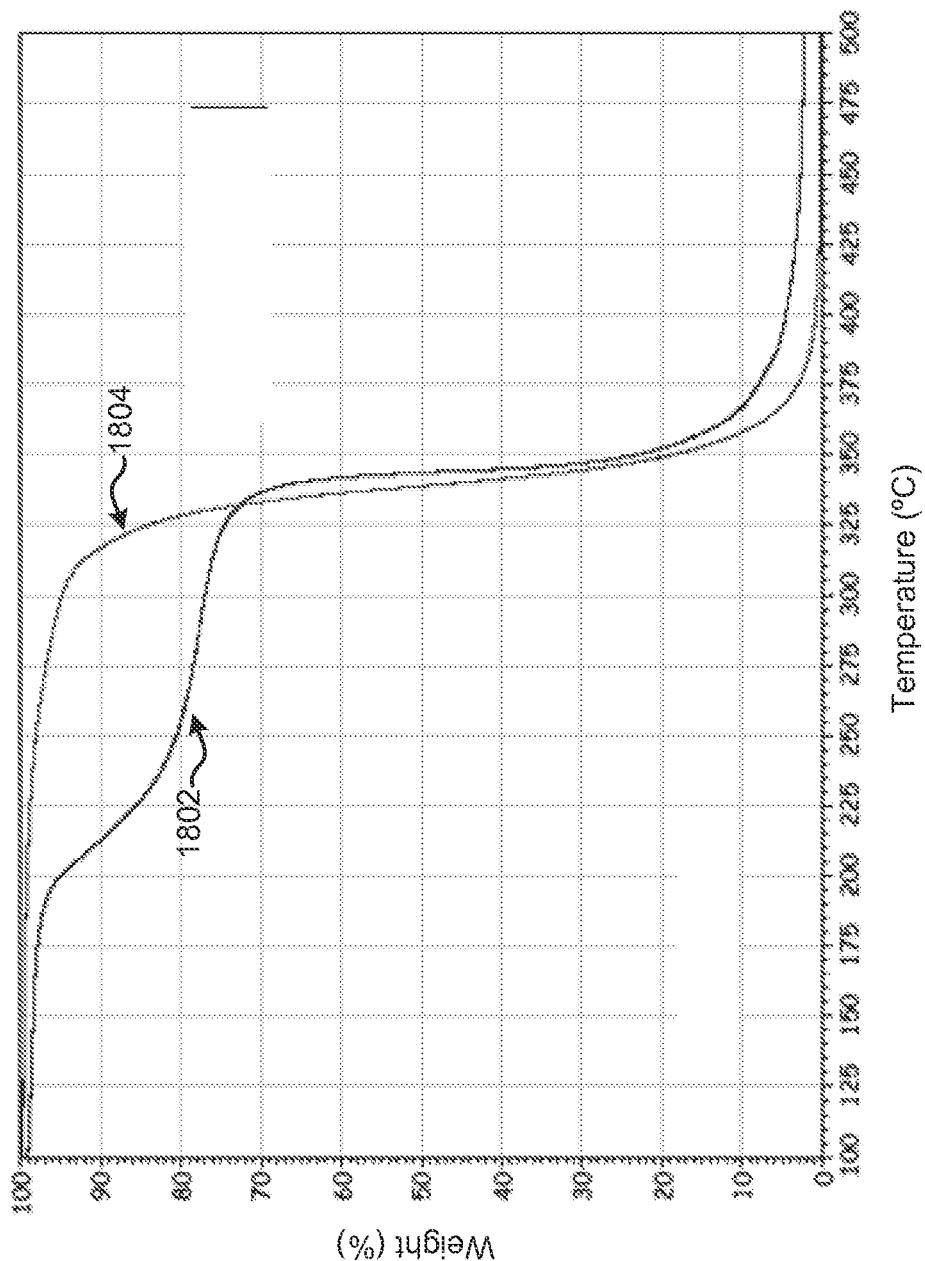
FIG. 18 is a plot illustrating the TGA of ZTMD synthesized according to the method of FIG. 4, along with a highly purified ZTMD standard synthesized according to the method of FIG. 3.

(FW=324.22 g·mol$^{-1}$, 14.6 µl, 0.0203 g, 0.0625 mmol, 1.0 eq.), and the mixture was sonicated to form an emulsion and cooled to 0° C. in an ice bath. Boron trifluoride diethyl etherate (FW=141.93 g·mol$^{-1}$, 5.0 µl, 0.00564 g, 0.0397 mmol, 0.64 eq.) was added, the reaction mixture was vortexed briefly, sonicated for another 3 min, and then heated to 80° C. for 5 min with intermittent vortexing. The reaction mixture, which remained cloudy but thickened noticeably, was heated for an additional 12 h at 57° C. The reaction mixture was cooled to room temperature and 1,2-dichloro-1,1,3,3,3-pentafluoropropane (Asahiklin AK 225; 3 ml) was added. A white semi-solid material (59.0 mg) remained, which was isolated by centrifugation and showed significant, but not complete, solubility in a 5:1 (vol/vol) mixture of hexafluorobenzene:methanol-d$_4$; ZTMD exhibits complete solubility. $^{19}$F-NMR spectroscopy indicated that the material contained a strong Ztetraol backbone and the spectrum was consistent with ZTMD. The $^1$H-NMR spectrum was also consistent with ZTMD, and no oxirane functionality could be observed, indicating complete reaction of the diepoxide coupling agent. Negligible acetonide functionality was observed in the $^1$H-NMR spectrum, indicating lability of the Ztetraol acetonide protecting groups in the presence of the Lewis acid catalyst. It is unknown whether the acetonide protecting groups were lost before the coupling agent was fully reacted, allowing for the possibility that some higher molecular weight oligomer may have been formed. FIG. 18 shows the thermal gravimetric analysis of the newly synthesized ZTMD (1802) prepared according to method 400 (FIG. 4), along with a highly purified ZTMD standard (1804) prepared according to method 300 (FIG. 3) for comparison. The early mass loss in the newly synthesized ZTMD (1802) is attributable to residual unreacted Ztetraol, and is a common component in ZTMD samples before purification.

Figure 19:
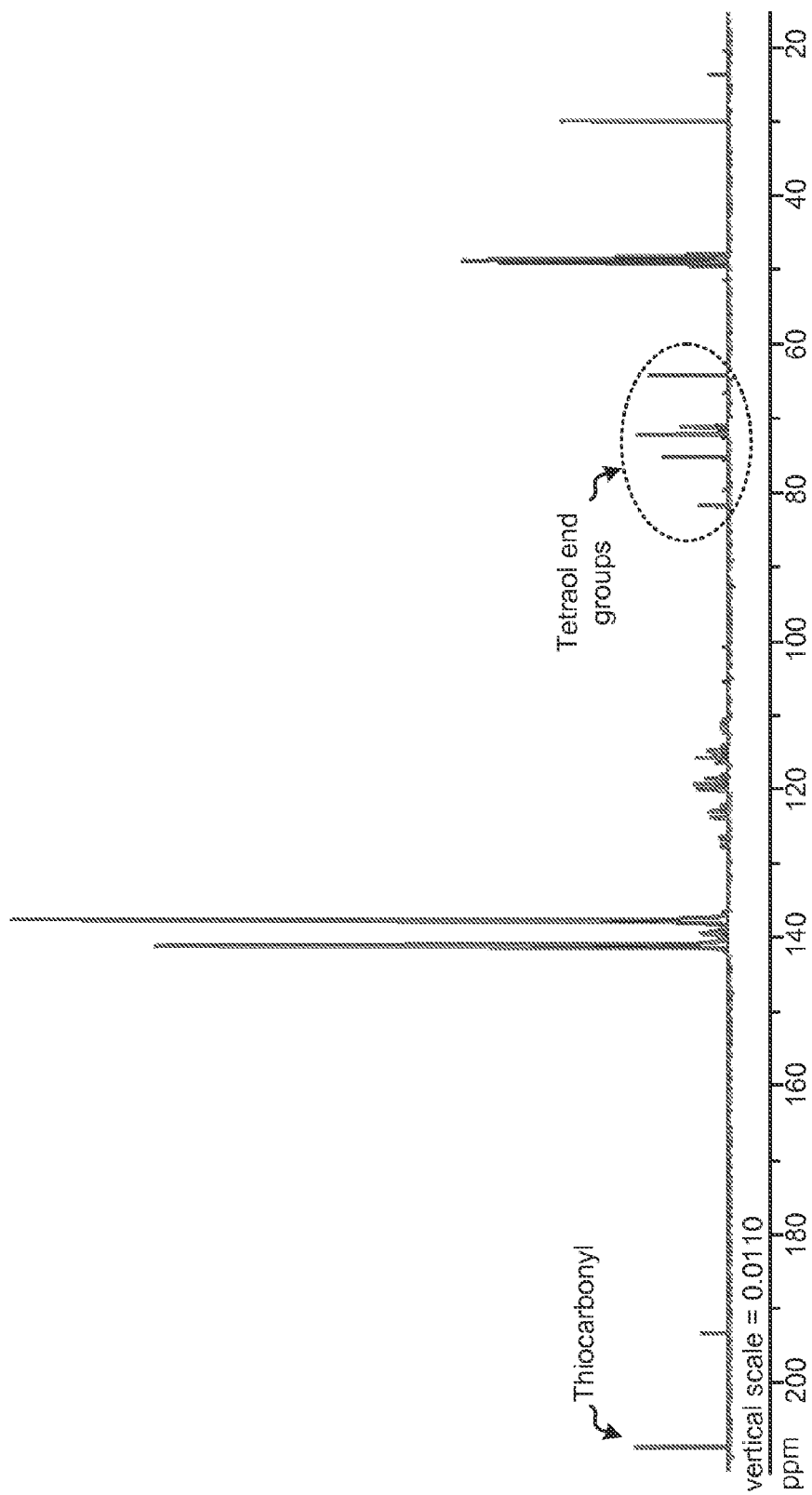
FIG. 19 is a $^{13}C$ nuclear magnetic resonance (NMR) spectrum of Ztetraol monothiocarbonate.

In another illustrative embodiment, Ztetraol-GT (Solvay Solexis; $M_w$=1200 g·mol$^{-1}$, 1.0921 g, 0.9101 mmol, 1 eq.) was dissolved in 1,2-dichloro-1,1,3,3,3-pentafluoropropane (Asahiklin AK 225; 2.0 ml). To this solution was added 1,1'-thiocarbonyldiimidazole (FW=178.21 g·mol$^{-1}$, 0.0649 g, 0.364 mmol, 0.40 eq.) and acetonitrile (2.0 ml). The reaction mixture was stirred at room temperature for 4 d, during which time the solution changed from yellow in color to colorless. The Ztetraol monothiocarbonate (FIG. 6) was purified by normal-phase column chromatography (30 g silica gel, 60-200 mesh, 60 Å pore size) under single-step isocratic conditions (200 ml of 5% methanol/dichloromethane balance, then 7.5% methanol/dichloromethane balance) to yield 281.3 mg of product as a moderately viscous colorless oil (0.2265 mmol, 25% yield; the theoretical maximum yield is 50% since a best-case statistical distribution of products is expected to result in 25% unreacted Ztetraol, 50% Ztetraol monothiocarbonate, and 25% Ztetraol dithiocarbonate). The isolated Ztetraol monothiocarbonate was analyzed by quantitative $^{13}$C-NMR spectroscopy and the end groups were found to be 50% thiocarbonate protected. With the methanol-d$_4$ carbon chemical shift referenced to 49 ppm, the thiocarbonyl carbon chemical shift appears at 209 ppm (see FIG. 19).

In an extension of this embodiment, Ztetraol monothiocarbonate ($M_w$=1242 g·mol$^{-1}$, 0.2543 g, 0.2048 mmol, 1.93 eq.), 1,2-dichloro-1,1,3,3,3-pentafluoropropane (Asahiklin AK 225; 0.33 ml), and sulfuric acid (1.0 µl) were stirred, and the diepoxide coupling agent possessing the following structure:

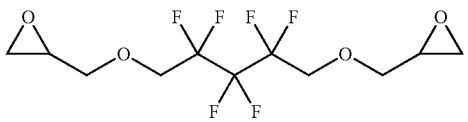 [SMILES: FC(F)(COCC1CO1)C(F)(F)C(F)(F)COCC1CO1]

Figure 20:
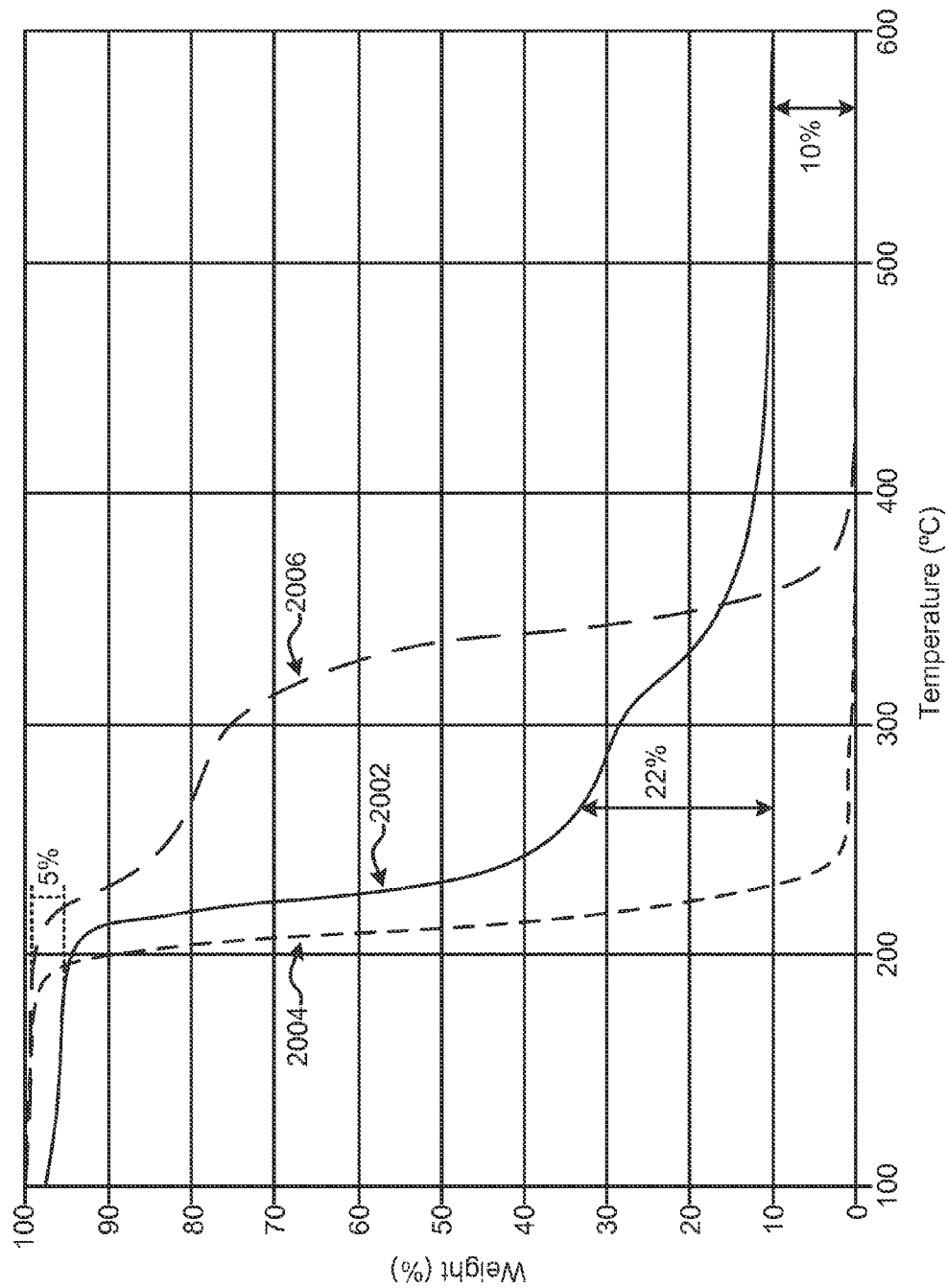
FIG. 20 is a plot illustrating the TGA of a Ztetraol standard, a ZTMD standard, and ZTMD synthesized according to the method of FIG. 4.

(FW=324.22 g·mol$^{-1}$, 0.03433 g, 0.1059 mmol, 1.0 eq.) was slowly added dropwise to the solution such that the temperature was maintained below 30° C. After 3 d, the solvent was removed under vacuum, and the reaction product was washed five times with distilled water and then dried under vacuum. $^{13}$C-NMR spectroscopy in a 5:1 (vol/vol) mixture of hexafluorobenzene:methanol-d$_4$ (1 ml) showed that the thiocarbonate protecting group persisted after the coupling reaction, confirming its acid stability. The ZTMD dithiocarbonate product was deprotected while still in the NMR solvent by adding saturated aqueous potassium carbonate (5 ml) and stirring vigorously for 3 h at 60° C. The solvent was removed by rotary evaporation, and the deprotected ZTMD was dissolved in hexafluorobenzene:methanol-d$_4$ (1 ml), and filtered. Thermal gravimetric analysis of the filtrate was performed, the results of which are shown in FIG. 20. Without wishing to be bound by any particular theory, it is believed that for the deprotection reaction product (2002), the initial 5% mass loss is due to volatilization of the NMR solvent, while the residual 10% of non-volatile material is believed to be potassium carbonate from the deprotection reaction. As such, it is necessary to normalize the mass changes by rescaling the data to eliminate the contribution from the residual NMR solvent and the potassium carbonate. The 63% mass loss with an onset of about 200° C. is consistent with unreacted Ztetraol (compare with Ztetraol standard 2004), and the 22% mass loss with an onset of about 265° C. is consistent with ZTMD (compare with ZTMD standard 2006). It is important to note that the ZTMD standard 2006 contains some Ztetraol, hence the mass loss at two distinct temperatures. These data provide evidence for a successful, albeit incomplete, coupling reaction.

Figure 21:
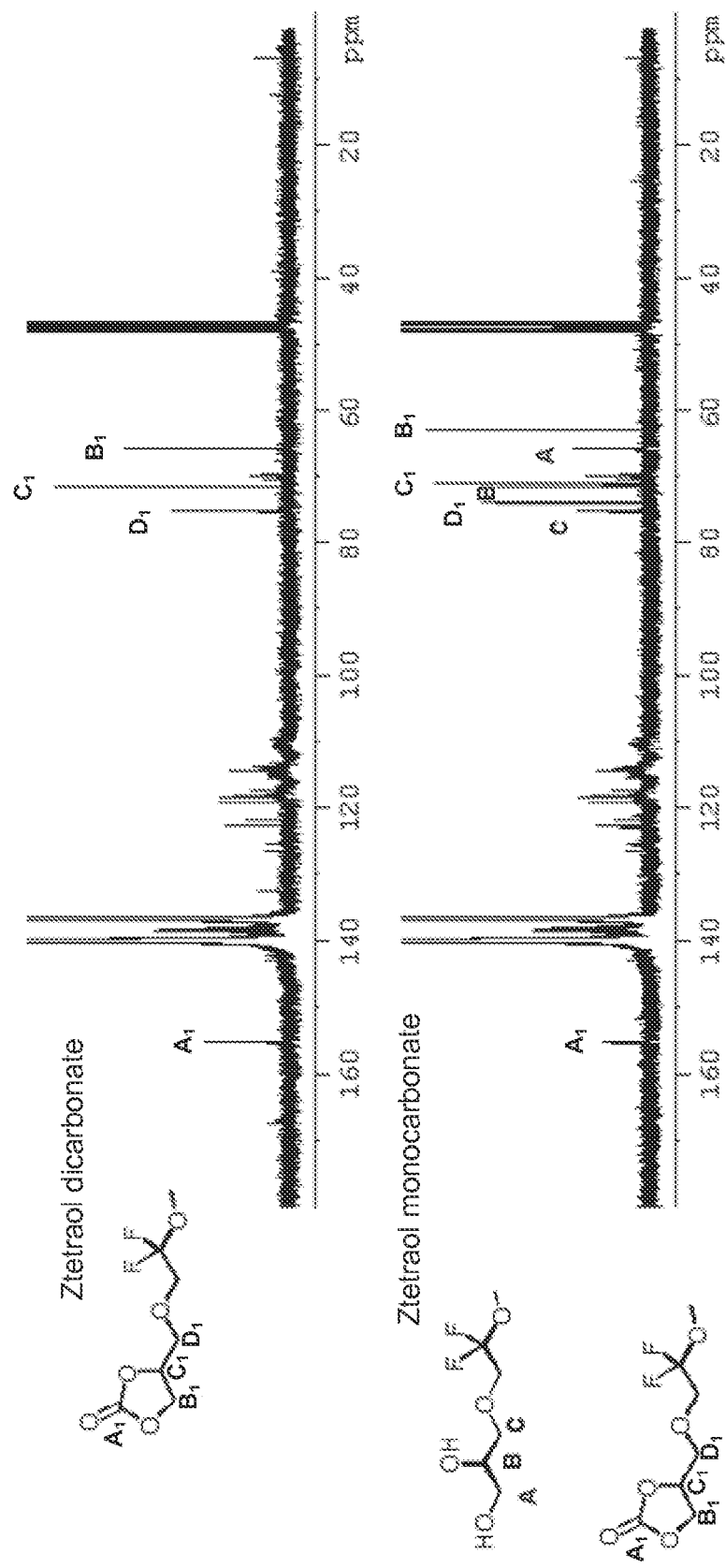
FIG. 21 is a $^{13}C$ NMR spectrum of isolated Ztetraol monocarbonate and Ztetraol dicarbonate.
Figure 22:
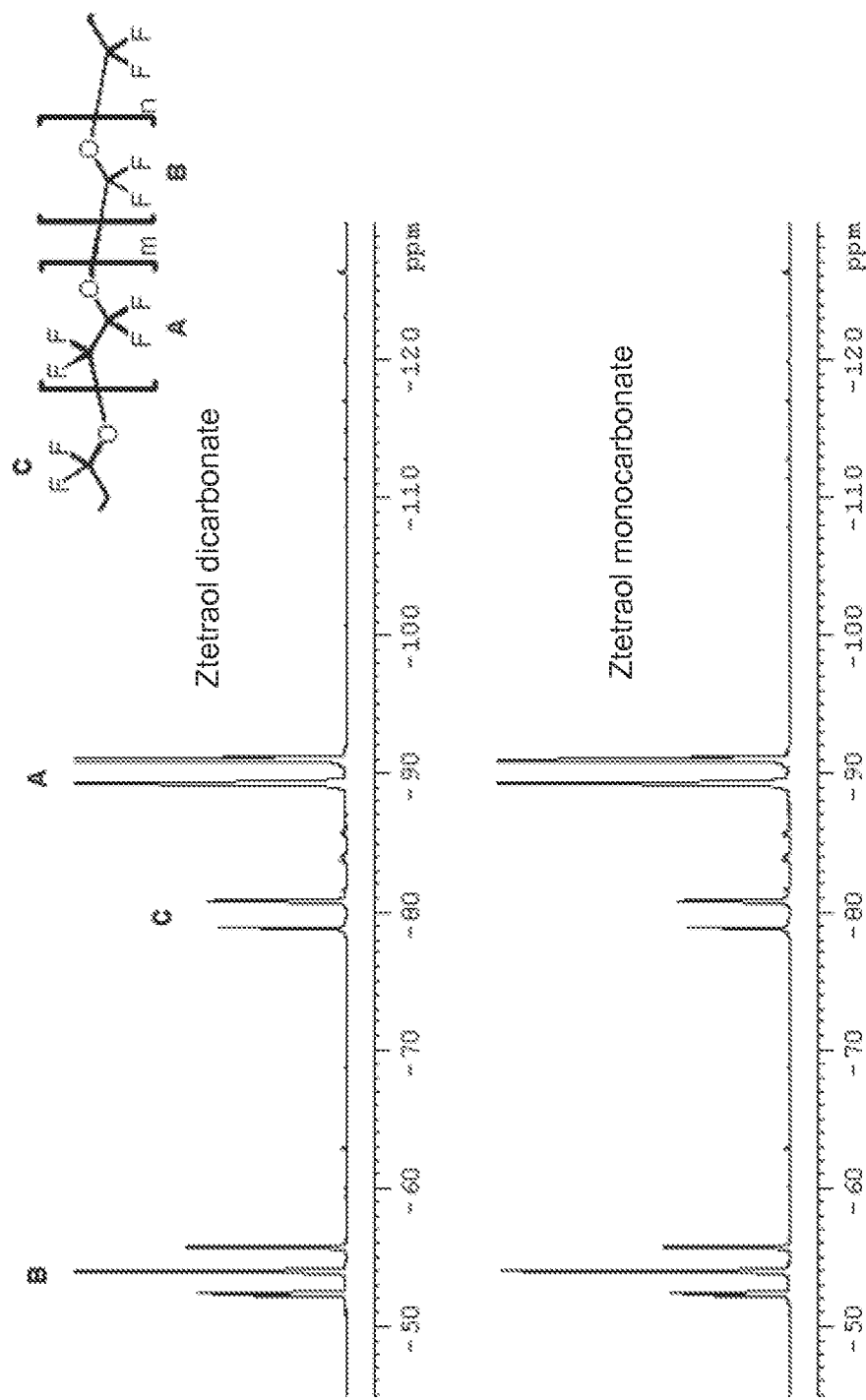
FIG. 22 is a $^{19}F$ NMR spectrum of isolated Ztetraol monocarbonate and Ztetraol dicarbonate.
Figure 23:
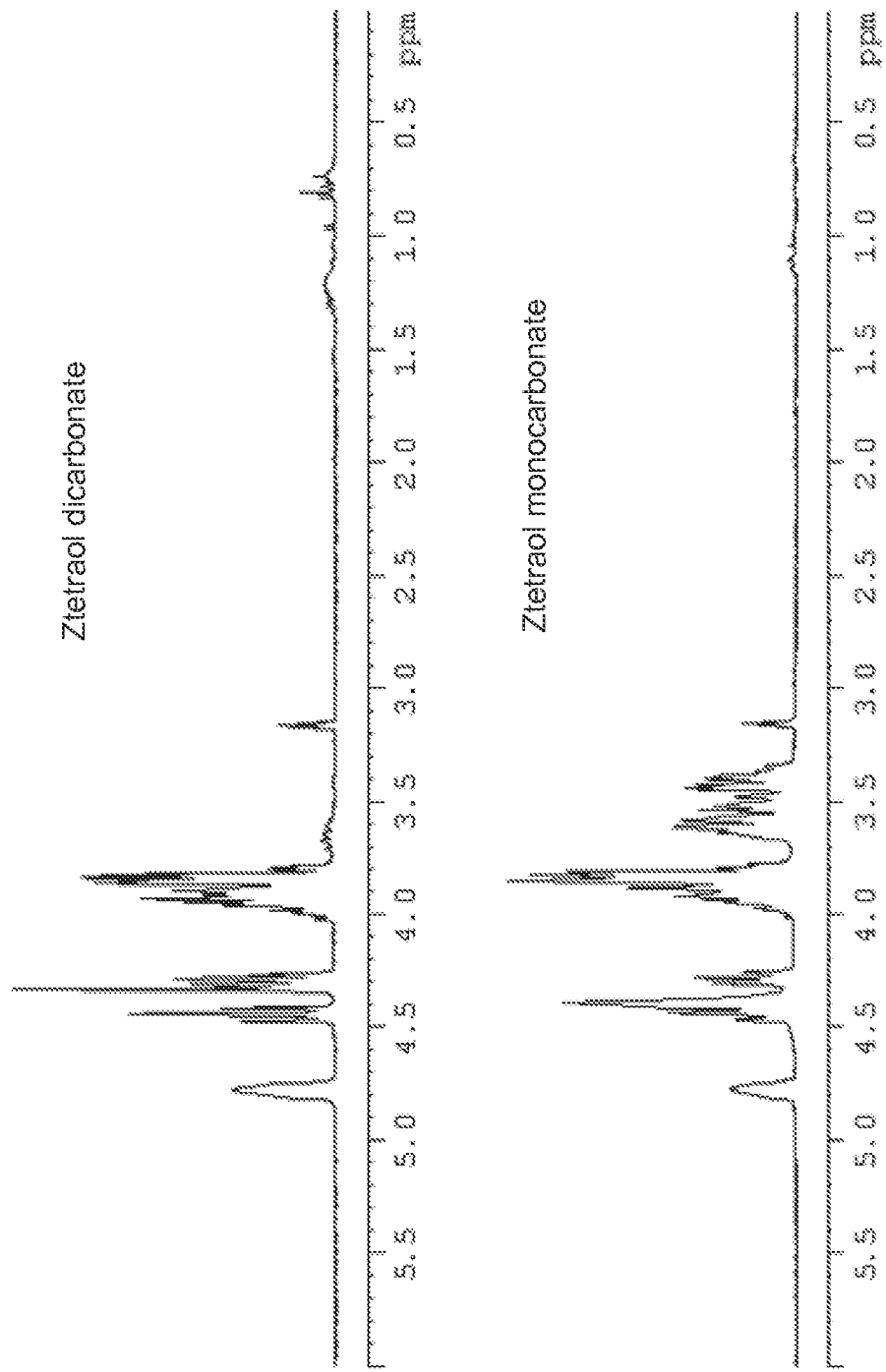
FIG. 23 is a $^{1}H$ NMR spectrum of isolated Ztetraol monocarbonate and Ztetraol dicarbonate.
Figure 24:
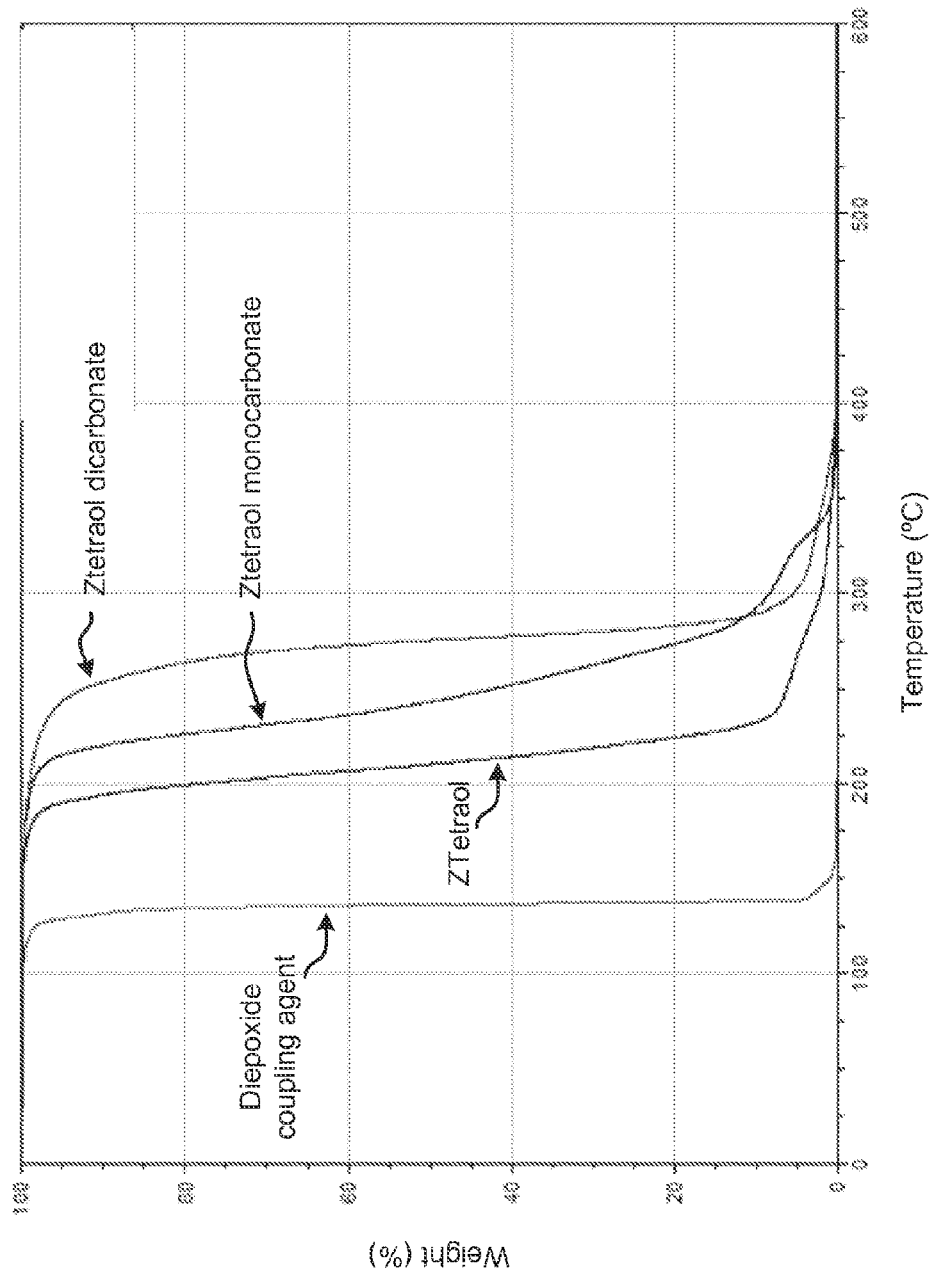
FIG. 24 is a plot illustrating the TGA of isolated Ztetraol monocarbonate and Ztetraol dicarbonate.

In yet another illustrative embodiment, Ztetraol-GT (Solvay Solexis; $M_w$=1200 g·mol$^{-1}$, 20.00 g, 16.67 mmol, 1 eq.) was dissolved in 1,2-dichloro-1,1,3,3,3-pentafluoropropane (Asahiklin AK 225; 23.8 ml). To this solution was added 1,1'-carbonyldiimidazole (FW=162.15 g·mol$^{-1}$, 1.35 g, 8.33 mmol, 0.5 eq.) and acetonitrile (23.8 ml). The reaction mixture was stirred at room temperature for 24 h, after which time an additional quantity of carbonyldiimidazole (0.20 g, 1.23 mmol, 0.074 eq.) was added. The reaction mixture was stirred for an additional 48 h at room temperature, and the reaction products were purified by normal-phase column chromatography (200 g silica gel, EMD Grade 62, 60-200 mesh, 150 Å pore size) under isocratic conditions (7.5% methanol/dichloromethane balance) to yield 7.3 g of Ztetraol monocarbonate (FIG. 7; 5.95 mmol, 36% yield; the theoretical maximum yield is 50% since a statistical distribution of products is expected: 25% unreacted Ztetraol, 50% Ztetraol monocarbonate, 25% Ztetraol dicarbonate). The isolated Ztetraol monocarbonate and Ztetraol dicarbonate were analyzed by quantitative $^{13}$C-NMR (FIG. 21), $^{19}$F-NMR (FIG. 22), and $^{1}$H-NMR (FIG. 23) spectroscopies, and thermal gravimetric analysis (FIG. 24). Without wishing to be bound by any particular theory, it is believed that unlike acetonide-protected Ztetraol, the mono- and di-carbonate-protected Ztetraols exhibit higher boiling points than unprotected Ztetraol because of strong dipole-dipole intermolecular interactions between the cyclic carbonate groups.

In an extension of this embodiment, Ztetraol monocarbonate ($M_w$=1226 g·mol$^{-1}$, 3.50 g, 2.855 mmol, 2.0 eq.) was dissolved in Freon 113 and extracted with dilute aqueous hydrochloric acid and then water to remove any unreacted imidazole byproduct carried over from the Ztetraol protection reaction; removal of the imidazole is essential since it would otherwise react with and inactive the sulfuric acid catalyst. The Ztetraol monocarbonate was dried under vacuum for 12 h to remove all traces of water, which would otherwise hydrolyze the diepoxide coupling agent. The dry imidazole-free Ztetraol monocarbonate was dissolved in Freon 113 (7 ml), and electronic grade sulfuric acid (14 µl) was added. The diepoxide coupling agent possessing the following structure:

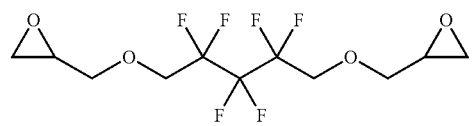 [SMILES: FC(F)(COCC1CO1)C(F)(F)C(F)(F)COCC1CO1]

Figure 25:
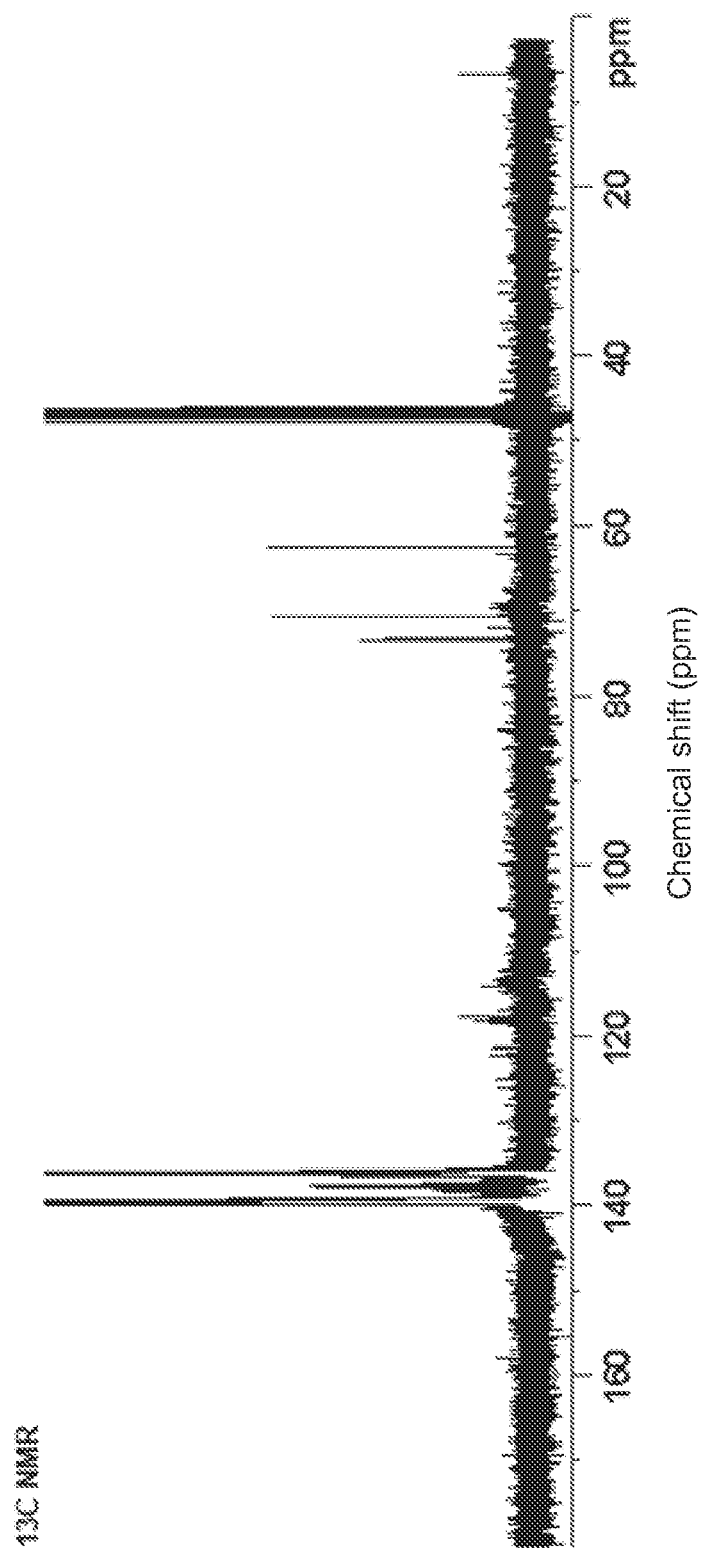
FIG. 25 is a $^{13}C$ NMR spectrum of ZTMD synthesized according to the method of FIG. 4.
Figure 26:
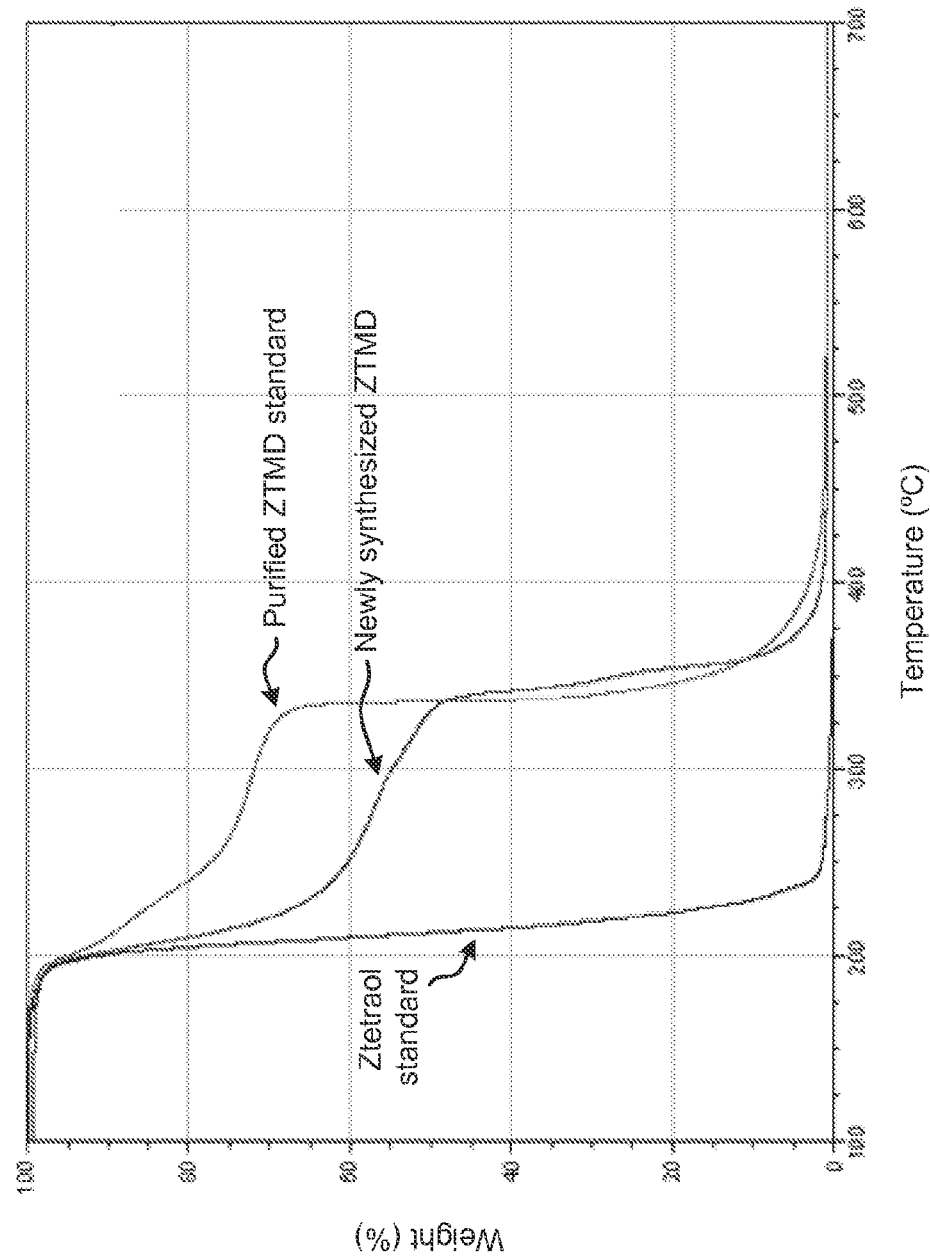
FIG. 26 is a plot illustrating the TGA of a ZTMD standard, a Ztetraol standard, and a ZTMD synthesized according to the method of FIG. 4.

(FW=324.22 g·mol$^{-1}$, 0.4628 g, 1.4275 mmol, 1.0 eq.) was slowly added dropwise to the solution such that the temperature was maintained below 30° C. After 3 d, the solvent was removed under vacuum, and the reaction product was washed two times with distilled water and then dried under vacuum. The ZTMD dicarbonate product was deprotected by dissolving in Freon 113 (10 ml) and stirring vigorously with aqueous potassium carbonate (10 ml) for 3 h at 60° C. The Freon 113 solution of deprotected ZTMD was extracted three times with distilled water to remove potassium carbonate, and the solvent was removed under vacuum. ZTMD was characterized by $^{19}$F-NMR (not shown) and $^{13}$C-NMR (FIG. 25) spectroscopies and thermal gravimetric analysis (FIG. 26). Notably absent from the $^{13}$C NMR spectrum is the carbon signal from the carbonate protecting group, indicating successful deprotection of the ZTMD dicarbonate. These data provide evidence for a successful coupling reaction and deprotection, which gives about 60% ZTMD without any additional purification. In contrast, method 300 (FIG. 3) is known to give only about 15% ZTMD without additional purification, with the remaining material being unreacted Ztetraol.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for forming a substantially monodisperse lubricant, comprising:
providing a plurality of perfluoropolyether (PFPE) precursors, each PFPE precursor including two end segments and a PFPE backbone disposed therebetween;
protecting one of the end segments of each PFPE precursor with one or more protecting agents to form a plurality of mono-protected PFPE precursors, each mono-protected PFPE precursor including a protected end segment and an unprotected end segment; and
coupling the unprotected end segment of each of the mono-protected PFPE precursors to the unprotected end segment of another of the mono-protected PFPE precursors via a coupling agent to form multidentate PFPE structures.

2. The method as recited in claim 1, wherein at least one end segment of at least one PFPE precursor is represented by:

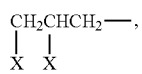

wherein each X is independently selected from a group consisting of: a hydroxyl group, a piperonyl group, an amine group, a phosphazene group, and a combination thereof.

3. The method as recited in claim 1, wherein the PFPE backbone of at least one PFPE precursor comprises at least one perfluoroethyl ether unit represented by:

$$-(CF_2CF_2O)_n-,$$

where n is an integer greater than zero.

4. The method as recited in claim 1, wherein the PFPE backbone of at least one PFPE precursor comprises at least one perfluoropropyl ether unit represented by:

$$-(CF_2CF_2CF_2O)_n-,$$

where n is an integer greater than zero.

5. The method as recited in claim 1, wherein the PFPE backbone of at least one PFPE precursor has a molecular weight in a range between about 300 amu to about 5000 amu.

6. The method as recited in claim 1, wherein each end segment of at least one PFPE precursor includes at least one reactive functional group configured to attach to a surface.

7. The method as recited in claim 6, wherein the at least one reactive functional group is a hydroxyl.

8. The method as recited in claim 6, wherein the at least one reactive functional group is selected from a group consisting of: a hydroxyl group, a piperonyl group, an amine group, a carboxylic acid, a phosphazene group, and a combination thereof.

9. The method as recited in claim 6, wherein the one or more protecting agents in each protected end segment are configured to protect the at least one reactive functional group present therein.

10. The method as recited in claim 6, wherein each end segment of at least one PFPE precursor includes two reactive functional groups configured to attach to a surface.

11. The method as recited in claim 1, wherein the plurality of mono-protected PFPE precursors include: mono(acetonide)-protected PFPE precursors; mono(carbonate)-protected PFPE precursor; mono(thiocarbonate)-protected PFPE precursors; and combinations thereof.

12. The method as recited in claim 1, wherein at least one of the multidentate PFPE structures includes eight reactive functional groups configured to attach to a surface.

13. The method as recited in claim 12, wherein each of the eight reactive functional groups include a hydroxyl group.

14. The method as recited in claim 1, wherein the multidentate PFPE structures have a molecular weight that is substantially the same wherein the PFPE structures have a polydispersity index of 1 to 1.5.

15. The method as recited in claim 1, further comprising removing at least one of the protecting agents from at least one of the multidentate PFPE structures.

16. A method for preparing a magnetic recording medium, the method comprising,
applying a lubricant layer to a surface of a magnetic recording medium using a deposition technique selected from a group consisting of: dip coating, spin coating, spray coating, and combinations thereof,
wherein the lubricant layer is comprised of a plurality of monodisperse multidentate perfluoropolyether (PFPE) structures,
wherein each of these multidentate PFPE structures has two end segments and a middle segment disposed therebetween,
wherein the middle segment of each multidentate PFPE structure comprises at least two PFPE backbones coupled together via a coupling group,
wherein the multidentate PFPE structures have a molecular weight that is substantially the same, and
wherein the PFPE structures have a polydispersity index of 1 to 1.5.

17. A substantially monodisperse lubricant, comprising:
a plurality of multidentate perfluoropolyether (PFPE) structures, each multidentate PFPE structure including at least two end segments and a middle segment therebetween,
wherein the multidentate PFPE structures have a molecular weight that is substantially the same,
wherein the PFPE structures have a polydispersity index of 1 to 1.5.

18. The lubricant as recited in claim 17, wherein at least one end segment of at least one multidentate PFPE structure is represented by:

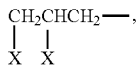

wherein each X is independently selected from a group consisting of: a hydroxyl group, a piperonyl group, an amine group, a phosphazene group, and a combination thereof.

19. The lubricant as recited in claim 17, where the middle segment of at least one multidentate PFPE structure comprises at least two PFPE backbones coupled together via a coupling group.

20. The lubricant as recited in claim 19, where at least one of the PFPE backbones is represented by:

where n is an integer greater than zero.

21. The lubricant as recited in claim 17, wherein each end segment of each multidentate PFPE structure includes at least one reactive functional group configured to attach to a surface, wherein the at least one reactive functional group is selected from a group consisting of: a hydroxyl group, a piperonyl group, an amine group, a carboxylic acid, a phosphazene group, and a combination thereof.

22. The lubricant as recited in claim 17, wherein at least one end segment of at least one of the multidentate PFPE structures includes at least one protecting agent.

23. The lubricant as recited in claim 22, wherein the at least one protecting agent is selected from a group consisting of: an acetonide; a carbonate; and a thiocarbonate.

24. A magnetic recording medium, comprising:
a magnetic recording layer positioned above a non-magnetic substrate;
a protective overcoat positioned above the magnetic recording layer; and
a lubricant layer positioned above the protective overcoat, the lubricant layer comprising the lubricant as recited in claim 17.

25. A magnetic data storage system, comprising:
at least one magnetic head;
the magnetic recording medium as recited in claim 24;
a drive mechanism for passing the magnetic recording medium over the at least one magnetic head; and
a controller electrically coupled to the at least one magnetic head for controlling operation of the at least one magnetic head.

* * * * *